US011705745B2

(12) United States Patent
Lollo et al.

(10) Patent No.: US 11,705,745 B2
(45) Date of Patent: Jul. 18, 2023

(54) COUPLING INTERFACE AND METHOD OF OPERATION

(71) Applicant: FRANCE BREVETS, Paris (FR)

(72) Inventors: Daniel Lollo, Paris (FR); Timothée Le Quesne, Versailles (FR); Matthieu Poidatz, Dornes (FR)

(73) Assignee: ENERGYSQUARE, Saint-Mande (FR)

( * ) Notice: Subject to any disclaimer, the term of this patent is extended or adjusted under 35 U.S.C. 154(b) by 838 days.

(21) Appl. No.: 16/626,978

(22) PCT Filed: Jul. 3, 2018

(86) PCT No.: PCT/EP2018/068009
§ 371 (c)(1),
(2) Date: Dec. 27, 2019

(87) PCT Pub. No.: WO2019/007995
PCT Pub. Date: Jan. 10, 2019

(65) Prior Publication Data
US 2020/0177006 A1 Jun. 4, 2020

(30) Foreign Application Priority Data
Jul. 3, 2017 (EP) .................................... 17305857

(51) Int. Cl.
H01M 10/44 (2006.01)
H01M 10/46 (2006.01)
H02J 7/00 (2006.01)
(52) U.S. Cl.
CPC .......... H02J 7/0042 (2013.01); H02J 7/0045 (2013.01); H02J 7/00047 (2020.01); H02J 7/0013 (2013.01); H02J 2207/20 (2020.01)

(58) Field of Classification Search
CPC ...... H02J 7/0042; H02J 7/0013; H02J 7/0045; H02J 7/000047; H02J 50/10; H02J 7/00036; H02J 2207/20; H01R 13/70
(Continued)

(56) References Cited

U.S. PATENT DOCUMENTS 7,417,197 B2   8/2008 Kent et al.
2007/0085694 A1   4/2007 Larkin
(Continued)

FOREIGN PATENT DOCUMENTS

EP   1 944 849 A2   7/2008
EP   3 029 472 A1   6/2016
(Continued)

OTHER PUBLICATIONS

Translation of WO2017046458A1. Mar. 23, 2017 (Year: 2017).*
International Search Report and Written Opinion for PCT/EP2018/068009, dated Aug. 6, 2018.

Primary Examiner — Edward Tso
(74) Attorney, Agent, or Firm — Meagher Emanuel Laks Goldberg & Liao, LLP

(57) ABSTRACT

A charging surface comprising multiple conductive regions can be used to charge an electronic device placed on it the surface so that electrodes on the device engage respective conductive regions of the surface. In order to distinguish such chargeable devices from short circuits and other spurious connections, the coupling interface associated with the charging surface is controlled so as to establish a text voltage across each pair of conductive regions in sequence, and look for pairs of conductive region demonstrating a voltage drop characteristic of a particular class of device. Relationships between every pair of conductive regions can be determined and recording, and the voltage level supplied to each conductive region set accordingly. The coupling interface may furthermore operate to identify device classes, and to set (Continued)

supply voltages or establish additional connections on the basis of stored device class information. Discrimination on the basis of voltage drop can be enhanced by the provision of a coupling adapted associated with a device to be detected, where the coupling adapter demonstrates an anti-inversion characteristic, for example implemented with a MOSFET, across at least a pair of these electrodes.

14 Claims, 10 Drawing Sheets

(58) Field of Classification Search
USPC .................................................. 320/107, 108
See application file for complete search history.

(56) References Cited

U.S. PATENT DOCUMENTS

| | | |
|---|---|---|
| 2010/0022285 A1 | 1/2010 | Randall et al. |
| 2011/0216449 A1 | 9/2011 | Reschovsky et al. |
| 2015/0365138 A1* | 12/2015 | Miller ................ H01M 10/482 307/104 |
| 2017/0179744 A1 | 6/2017 | Zhang |

FOREIGN PATENT DOCUMENTS

| | | |
|---|---|---|
| WO | 2005/060401 A2 | 7/2005 |
| WO | 2017046458 A1 | 3/2017 |

* cited by examiner

COUPLING INTERFACE AND METHOD OF OPERATION

FIELD OF THE INVENTION

The present invention relates generally to establishment of electrical connections in a context supporting arbitrary device dispositions, and in particular planar recharging surfaces with multiple contact zones.

BACKGROUND OF THE INVENTION

Over recent years portable electronic devices have become increasingly ubiquitous-telephones, media players, tablet and laptop computers, IoT (Internet of Things) devices or the like and portable loudspeaker units are now widespread. With a tendency towards miniaturisation on one hand, and the increasing size and brightness of displays and expectancy of wireless connectivity on the other, demands on the energy storage capacity of the batteries of these devices are more and more challenging. In view of these considerations, users are increasingly subject to "low battery anxiety", where the level of charge of their various devices, and the time until the next opportunity to recharge them, is a continuous source of concern. An attempt to address this problem using stand alone general purpose rechargeable battery units adds to the list of devices to be recharged and carried. This issue is further complicated by the range of power connectors and varying voltage requirements of these devices, which can make it necessary for individuals to carry a range of chargers and cables with them, nullifying many of the advantages of the devices miniaturisation.

WO2017046458 presents a partial solution to this problem.

FIG. 1 presents aspects of the prior art approach provided by WO2017046458.

As shown, a nomadic electronic device 120 is positioned to be recharged on a planar mating surface 110 provided with a plurality of contact zones 111, 112, 113, 114, by using an adapter 121.

FIG. 2 presents aspects of the prior art approach provided by WO2017046458 in further detail. As shown, the nomadic electronic device 120 is positioned to be recharged on a planar recharging surface 110 provided with a plurality of contact zones 111, 112, 113, 114, by using an adapter, which is represented in FIG. 2 as the footprint 221 of the adapter 130 on the surface 110. As shown in FIG. 2, the adapter 130 defines two electrically conducting terminals 231, 232 of small cross section in an external face of the adapter strip.

For each device to be energized, there is provision to abut an internal face of the strip against a face of the device and to engage a connector into the device on the side of a bent part of the strip to place the adapter between the device and the recharging surface so as to allow conduction from two of the contact zones, the terminals 231, 232 being spaced a predetermined distance apart which is much greater than their cross-sectional size. As described in WO2017046458, contact zones are selectively energized with current, so that the zones 112, 114 on which the two terminals 231, 232 are positioned respectively come into a functional state and allow recharging of the device 120 via the adapter 230.

As described in WO2017046458, in order to determine the status of each contact zone with a view to determining the presence of a device to be charged, there is provided a processing unit which is able to briefly drive independently each of the conductive zones from a low potential (e.g. 0V) to a high potential (e.g. 5V). The processing unit also manages a data link to drive ADCs for measuring the current drawn by each conductive zone. If the current drawn corresponds to an expected current value for a chargeable device, the high voltage is maintained on the corresponding conductive zone. Otherwise, the element 80 is returned to the low voltage.

Accordingly, nomadic devices equipped with the proposed adapter can be placed freely on such a planar surface equipped with the described system, and hopefully be detected and provided with a power supply voltage accordingly.

A drawback of this approach lies in the fact that in a case where an electrical connection exists between any two conductive regions for some reason besides the presence of a chargeable device, for example due to a conductive article such as a metal tool or ornament being placed on the surface, the measurement process will create a short circuit to ground through this connection, leading to a flow of current. Depending on the conductive properties of the article, this may appear to the controller as characteristic of a chargeable device, which may lead to an attempt to supply power to the article, leading to a waste of energy and possible damage to the article, the conductive zones or the controller.

US2010/022285 presents a related solution for retrofitting a mobile electronic device, which has an input power receptacle located on its side, to receive power from a power delivery pad that has a flat power delivery surface. A connector assembly is connectable to the mobile electronic device by plugging a connector into the input power receptacle of the device. A power receiver assembly connects pivotally and electrically to the connector assembly by magnetism. The power receiver assembly is pivotal to position a power receiver hub, which is at a fixed distance from the connector assembly, over an axis of the mobile device, where an anchor comprising magnetic material or a mechanical attachment apparatus is adhered to the surface of the mobile device, and the hub is attached to the anchor by magnetism also, so that it is simply and easily detachable and re-attachable. The connector is adjustable in the connector assembly to position the power receiver assembly flush with the surface of the mobile device. Alternate connector assemblies with differently configured connectors are attachable magnetically or mechanically to the power receiver assembly.

WO2005/060401 meanwhile describes a power transfer pad, having a non-conductive board having a top and a bottom plurality conductive substrates sections disposed across the top of the non-conductive board; at least one conducting element disposed on each of the conductive substrate sections; a plurality of electrical contacts on the bottom the non-conductive board, wherein each of the electrical contacts on the bottom of the non-conductive board are in electrical communication with one of the conductive substrate sections on the top of non-conductive board.

A general problem arising with these various technologies relates to the difficulties of channeling voltage at the proper level to the negative and positive terminals of any device to be supplied, whilst avoiding short circuits or short currents through conductive articles or substances that may come into contact with the charging surface. Generally, the preceding prior art methods rely to some extent on the dimensions and/or physical disposition of the charging regions of the surface, and of dielectric regions between them on one hand, and the physical disposition of charging terminals on the device to be charged on the other hand. In the case of WO2017046458 these provisions are supplemented by measuring the current drawn by respective pads.

These approaches are not entirely satisfactory since they represent constraints on the layout of the charging surface and/or the contacts of the charging terminals of the device, yet cannot rule out the inadvertent creation of short circuits. Additionally, prior art approaches tend to require complex electronics in the device itself for the device to be effectively detected and distinguished. It is thus as a consequence desirable to provide an arrangement offering improvements in these considerations.

SUMMARY OF THE INVENTION

In accordance with the present invention in a first aspect there is provided a coupling interface for establishing an electrical coupling with an electrically conductive article, wherein the coupling interface controls a plurality of conductive regions, each conductive region being switchably coupled under the control of the coupling interface to a first voltage, the coupling interface further comprising a controller configured to sequentially select each region and to switch the selected region to the first voltage, wherein each of the plurality of regions other than the selected region is coupled in a measurement condition to a second voltage, the second voltage defining a first potential difference with respect to the first voltage, wherein the coupling interface is further adapted to measure a voltage of each of the plurality of regions other than the selected region, and to compare each region voltage to one or more first reference voltage ranges, each first reference voltage range corresponding to a specified class of electrical device, and in a case where any region voltage corresponds to a respective first reference voltage range, considering an article belonging to the respective specified class of electrical device to be coupled across the selected region and the region having a region voltage corresponding to the respective first reference voltage range.

In a development of the first aspect, the coupling interface is further adapted to couple the voltage of the selected region to a third voltage and to couple the region having a voltage corresponding to a respective first reference voltage range, to a fourth voltage, where the difference between the third voltage and the fourth voltage corresponds to a defined supply voltage associated with the respective specified class of electrical device.

In a further development of the first aspect, the coupling interface is adapted in a case where any region voltage corresponds to a first short voltage range, considering an article to be coupled across the selected region and the region in a measurement condition to constitute a short circuit.

In a further development of the first aspect, the coupling interface is adapted in a case where an article to be coupled across the selected region and the region in a measurement condition is considered to constitute a short circuit, to couple the selected region and the region in a measurement condition to a common voltage.

In a further development of the first aspect, the coupling interface is adapted to further couple the selected region to a fifth voltage via a respective known resistance, and to switch the region in a measurement condition to a sixth voltage, the sixth voltage defining a potential difference with respect to the fifth voltage of opposite polarity to the potential difference defined by the first potential difference with respect to the second voltage, and to measure the voltage of the selected region, and in a case where the voltage of the selected region lies in a second short circuit voltage range establishing respective persistent electrical connections to said selected region and said region having a region voltage corresponding to said respective reference voltage range by said switching operation accordingly.

In a further development of this first aspect, the coupling interface is adapted in a case where the region voltage for any region falls in the reference voltage range to switch the selected region to a fifth voltage via a respective known resistance, and to switch the region in a measurement condition to a sixth voltage, the sixth voltage defining a potential difference with respect to the fifth voltage of opposite polarity to the potential difference defined by the first potential difference with respect to the second voltage, and to measure the voltage of the selected region, and in a case where the voltage of the selected region lies in a second reference voltage range, considering the article to be a power consuming electrical device coupled across the selected region and the region in a measurement condition.

In a further development of the first aspect, the coupling interface is further adapted such that:

coupling the selected region to the first voltage, and each further region in a measurement condition to the second voltage constitutes a first state and coupling the selected region to the fifth voltage, and the region in a measurement condition to the sixth voltage constitutes a second state, and wherein the coupling interface is adapted oscillate between the first state and the second state a plurality of times with a predetermined timing, and to measure a voltage of one or more regions other than the selected region at a plurality of the oscillations, and in a case where the voltage for any region exhibits a first predetermined characteristic consistently over the plurality of oscillations, considering the article to be coupled across the selected region and the region in a measurement condition.

In a further development of the first aspect, the predetermined timing is defined so as to distinguish mechanical or electrical oscillations of the article across the regions.

In a further development of the first aspect, the coupling interface is further adapted to establish one or more data connections between an information handling system and one or more respective conductive regions, wherein the respective conductive regions with respect to which data connections are established are selected as having a predetermined spatial relationship to the selected region and the region having a voltage falling within a reference voltage range.

In a further development of the first aspect, the predetermined spatial relationship is retrieved as a function of the respective specified class of electrical device.

In a further development of the first aspect, the coupling interface further comprises the plurality of conductive regions.

In a further development of the first aspect, the coupling interface further comprises a memory, the coupling interface being adapted to store values in the memory defining for each conductive region a relationship with each other conductive region, each the relationship being one of:

in low resistance connection to, providing current to, or receiving current from, wherein the coupling interface is adapted to determine and store each relation in the memory with reference to the voltage between every pair of conductive regions as determined in accordance with any preceding claim, and wherein the coupling interface is further adapted to couple the voltage of each conductive region as a function of the relationships.

In accordance with the present invention in a second aspect there is provided method of establishing an electrical connection with an electrically conductive article coupled across an arbitrary pair of conductive regions, the method comprising the steps of coupling a first the selected region to a first voltage, coupling each of the plurality of regions other than the selected region to a second voltage in a measurement condition, the second voltage defining a first potential difference with respect to the first voltage, via a respective known resistance, measuring the respective region voltage, comparing each region voltage to one or more first reference voltage ranges, each reference voltage range corresponding to a specified class of electrical device, and in a case where any region voltage corresponds to a respective first reference voltage range, establishing a respective persistent electrical connection to said selected region and said region having a region voltage corresponding to said respective reference voltage range by said switching operation accordingly.

In accordance with the present invention in a third aspect there is provided computer program adapted to implement the steps of the second aspect.

As a consequence, effectively identifying an electrical device susceptible to electrical connection via a coupling device mean that short circuits and other spurious connections can be advantageously avoided, reducing energy consumption, and reducing the risk of sparking or overheating, whilst enabling the convenient, plug-free charging, power supply or data connection for devices.

BRIEF DESCRIPTION OF THE DRAWINGS

The above and other advantages of the present invention will now be described with reference to the accompanying drawings, for illustration purposes only, in which.

DETAILED DESCRIPTION

Figure 3:
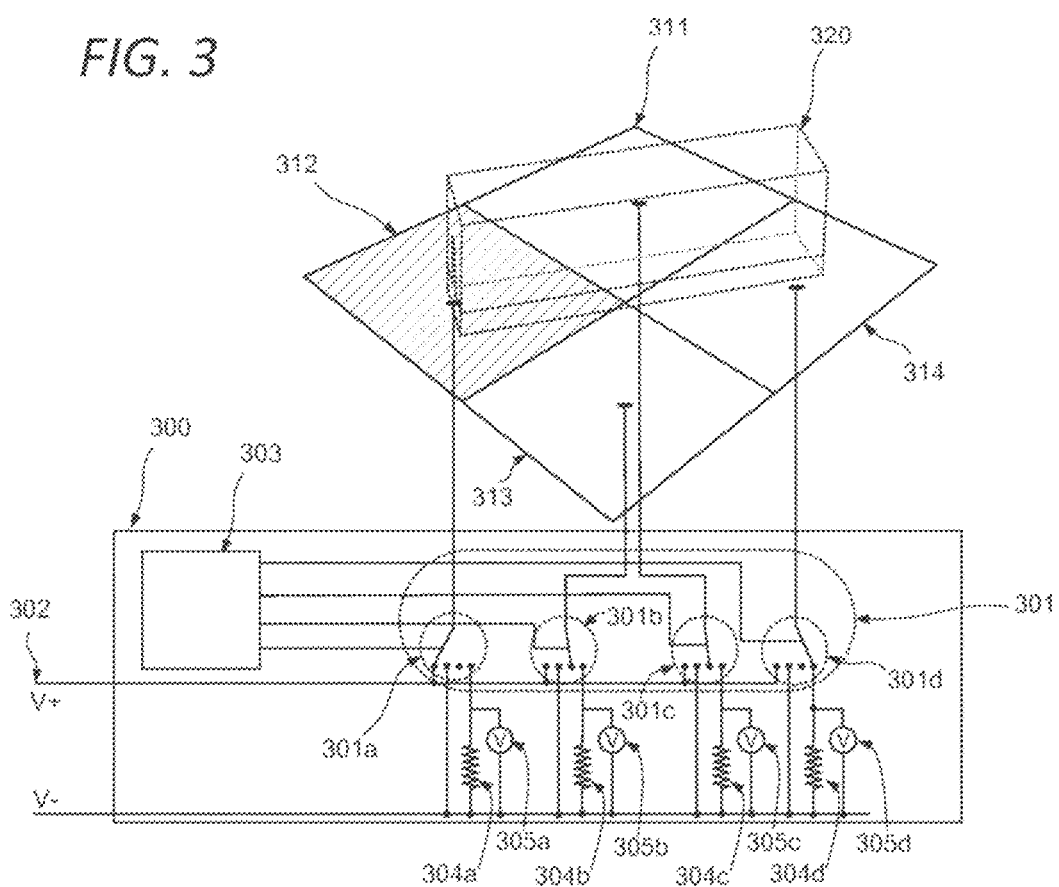
FIG. 3 shows a first embodiment.

FIG. 3 shows a first embodiment of the described solution.

As shown in FIG. 3, there is provided a coupling interface 300 for establishing an electrical connection with an electrically conductive article 320.

The coupling interface 300 controls a plurality of conductive regions 311, 312, 313, 314, constituting a mating surface, each conductive region 311, 312, 313, 314 being switchably coupled, for example by means of electronically controlled switches 301 under the control of the coupling interface 300 to a first voltage, here shown by way of example as a supply voltage V+ on supply line 302. Additional voltage supply rails and corresponding switch positions may be provided as discussed hereafter. The supply voltage may be any convenient voltage such as 3.3V, 5V, 12V, 20V etc. It may be a DC or AC voltage. The voltage used for the testing procedure as described herein need not correspond to the required supply voltage of the device in normal operation. The coupling interface 300 further comprises a controller 303 configured to sequentially select each region 311, 312, 313, 314 and to couple the instantaneously selected region (say 312 for example at a given instant) to a first voltage in a first state.

Each of the plurality of regions 311, 313, 314 other than the selected region 312 is coupled in turn to a second voltage in a measurement condition, the second voltage defining a first potential difference with respect the first voltage, via a respective known resistance 304a, 304b, 304c, 304d, and the respective voltage across each known resistance 304a, 304b, 304c, 304d is measured. As shown, the second voltage is 0V (ground).

The coupling interface 300 is further adapted to compare each measured region voltage to one or more first reference voltage ranges, where each first reference voltage range may correspond to a specified class of electrical device. In a case where any region voltage for any region 311, 313, 314 is found to correspond to a respective first reference voltage range, an article 320 belonging to the respective specified class of electrical devices is considered to be coupled across the selected region 312 and the region having a region voltage corresponding to the respective first reference voltage range, and respective persistent electrical connections established to the selected region and the region having a region voltage corresponding to said respective reference voltage range by the switching operation accordingly.

The coupling interface may then be further adapted to couple the voltage of the selected region to a third voltage and to couple the region in a measurement condition to a fourth voltage, where the difference between the third voltage and the fourth voltage corresponds to a preferred supply voltage associated with the respective specified class of electrical device.

The coupling interface may also be adapted in a case where any region voltage corresponds to a first short circuit voltage range to consider an article to be coupled across the selected region and the region having a region voltage corresponding to the first short circuit voltage range to constitute a short circuit. For the remainder of the present application such situations will be referred to as short circuits, even if the level of resistance is significant—as will become clear from the following description, embodiments of the present invention are able to distinguish even high resistance spurious connections from devices susceptible to electrical connection. The coupling interface may furthermore be adapted in these circumstances to couple the selected region and the region in a measurement condition to a common voltage. This common voltage may be zero volts or any other convenient value. The first short circuit voltage range may be fixed on the basis of the value of the pull down resistor 304a, 304b, 304c, 304d, and the expected minimal equivalent resistance of known devices.

It will be appreciated the switchable coupling may be achieved by many means, including by way of example electromechanical devices such as relays, electronic devices such as transistors or combinations of electronic devices implementing logic gates, multiplexers or the like, and so on. Still further, in some cases the device and/or coupling adapter may comprise addressable elements on a common bus.

It will be appreciated that while the mating surface as shown comprises a number of square conductive regions in a plane, other embodiments may use conductive regions of any shape, and each conductive region, or certain groups of conductive regions may vary in shape. The conductive regions need not be in a planar arrangement, but could conform to any three dimensional surface. The conductive may be separated with gaps or dielectric filler of varying dimensions, depending on the corresponding dimensions of the article as discussed below. Accordingly, while in some embodiments squares, hexagons or other tessellating shapes may be used in a planar disposition with minimal dielectric separations, in other embodiments the conducting regions may be of arbitrary two or three dimensional forms. Whether or not regular shapes are used, the same mating surface may comprise different conductive regions which vary in shape from one to the next.

As shown, the arrangement of FIG. 3 each of the switches 301a, 301b, 301c, 301d has four positions, with the first position of each switch being coupled to the 5V supply line 302, the second position coupled to the ground plane, the third position floating and the fourth position coupled to ground by the respective resistance 304a, 304b, 304c, 304d as discussed above. The term "floating" as used here may designate an open circuit as shown, or a high resistance connection to ground or another voltage as appropriate. As such, the arrangement of FIG. 3 is able to implement additional variants, by using the second position to couple the regions other than the selected region to ground in a first variant, It will be appreciated that implementations need not support such variants.

As shown, the first switch 301a corresponding to the conductive region 312, which in the current example is taken to be the selected region is in the first position coupling region 312 to 5V. Switches 301b and 301c corresponding to regions 311 and 313 are in the third position leaving these regions floating. Switch 301d is in the fourth position, coupling the conductive region 314 to ground via known resistance 304d. The voltage across resistance 304d can be measured by voltmeter 305d. Corresponding voltmeters 305a, 305b, 305c are shown in association with resistances 304a, 304b, 304c respectively. In accordance with the preceding discussion, in other phases regions 311 and 313 will be similarly coupled across their corresponding resistances whilst the other regions other than the presently selected region (312) are left floating.

The above described approach is sufficient to distinguish many devices from a short circuit or spurious connection by a low resistance object, since many such devices are provided with power management circuits intended to control the charging process. These circuits generally impose a brief pause before charging commences, during which time the device will be detected on the basis of its high equivalent resistance. Once charging starts, the device will draw a high current, which will often lead to the device being difficult to distinguish from a low resistance spurious connection, or short circuit.

One solution to this problem may be to add an upstream circuit that will cut its charging (but let the current go into the resistor) when the current goes below an operating voltage. In that case, if a resistor is selected for the coupling adapter that will draw enough current (with conductive regions in pull down mode to enable measurement of the voltage when testing) drop under the operating voltage of the battery, it will be possible to measure the exact voltage rise on the conductive regions related directly to the value of the resistance. As an example, a MOSFET-P that will cut when the voltage goes below a certain level and put between the resistor and the battery could be used thus to ensure that the battery will not draw current during the test.

This will also be the case for less sophisticated devices without charge management circuits. In order to distinguish such devices, the coupling interface may be adapted to enter a second state wherein the voltage of the selected region (312 in the current example) is coupled to a third voltage and to the region in a measurement condition to a fourth voltage, where the difference between the third voltage and the fourth voltage corresponds to a preferred supply voltage associated with the respective specified class of electrical device. In the present example, the third voltage may be ground, and the fourth voltage 5V, so that the new configuration can be achieved by switching the first switch 301a to the fourth position and the fourth switch 301d to the first position.

In some embodiments, the coupling interface may be adapted to enter the second state only where a conductive region has been found to have a voltage corresponding to a first reference voltage range in the first state. In other embodiments the coupling interface may also be adapted to enter the second state where a conductive region has been found to have a voltage corresponding to the first short circuit voltage in the first state.

In this second state, the selected region is coupled to a third voltage, and the region in a measurement condition is coupled to a fourth voltage, where the fourth voltage defines a second potential difference with respect to the third voltage of opposite polarity to the first potential difference. The polarities referred to herein relate to the potential difference between the two conductive regions under consideration, not the individual voltage of each conductive regions. If conductive region A is at 5V and conductive region B is at 0V, the potential difference across the terminals may be taken to be 5V, whilst if terminal A is at 0V and terminal B is at 5V, the potential difference across the terminals is −5V, so that the polarity in the second case (negative) is opposite to the polarity in the first case (positive). The skilled person will appreciate that any convenient voltage may be used in this testing process, and that the voltage used in the testing process need not be the same as the voltage finally provided to supply a connected device. Common supply voltages include 3.3V, 5V, 12V and 20V DC, and any of these or some other voltage may be used in the testing process. Regardless of the voltages used, in the first state if the first conductive region is set to a higher voltage than the second conductive region, in the second state the first conductive region is set to a lower voltage than the second conductive region, and if in the first state the first conductive region is set to a lower voltage than the second conductive region, in the second state the first conductive region is set to a higher voltage than the second conductive region. For example, the voltages of the two regions may simply be swapped. In the case of FIG. 3, this would mean changing switch 301a to position 4 and switch 301d to position 1. The voltage of the selected region (presently 312) may then be measured, and in a case where the voltage for the selected region exhibits a value in one of a set of second reference voltage ranges, considering the article to be a power consuming electrical device of the class corresponding to the respective second reference voltage range to be coupled across the selected region and the region exhibiting the voltage falling within the respective second reference voltage range.

Thus, either where the region voltage is not found to correspond to a respective reference voltage range, or where the region voltage is found to correspond to a certain specific reference voltage range corresponding to a voltage drop that is ambiguous, for example corresponding either to a short circuit or a device in a charging condition, the coupling interface may be adapted in to couple the selected region to a fifth voltage via a respective known resistance, and to couple the region having a voltage in the reference voltage range to a sixth voltage, the sixth voltage defining a potential difference with respect to the fifth voltage of opposite polarity to the potential difference defined by the first potential difference with respect to the second voltage, and to measure the voltage of the of the selected region, and in a case where the voltage of the selected region lies in a second voltage range, considering the article to be a conductive article creating a short circuit between the selected region and the region having a voltage lying in the reference voltage range. In a scenario where the first voltage is greater than the second, the sixth voltage will be greater than the fifth voltage in order to impose the specified polarity reversal. If the coupling of the first voltage to the selected conductive region and the second voltage to the further conductive region gave rise to a high voltage drop indicating a high current through the article coupled across these regions, the article may either be a basic battery drawing a high current in a charging mode, or may simply be a short circuit. As such in this first state the voltage will fall in the first short circuit voltage range. If the sixth voltage is equal to the second voltage and the fifth voltage is equal to the first voltage, the potential difference across the two conductive regions in each case will be equal, but of opposite polarity. With the sixth voltage coupled to the further conductive region and the fifth voltage coupled to the further region the same voltage drop (in the presence of the same potential difference) is visible, it can be deduced that the article represents a short circuit or spurious low resistance connection between the two conductive regions. As such in this second state the voltage will fall in the second short circuit voltage range. Accordingly, if the potential differences defined by the first and second voltages on one hand and the fifth and sixth voltages on the other are the same, the corresponding short circuit voltage range in the first case and the second short circuit voltage range will be the same. Where other voltages are selected, the corresponding first and second short circuit voltage ranges will vary accordingly.

Where this determination is made, the coupling interface may be adapted to switch the voltage of the selected region and the region exhibiting the first characteristic to a common voltage as discussed above. This common voltage may be 0 volts, that is to say, connection to ground, or may be any non zero voltage (positive or negative). In any case, by setting both regions to the same voltage any further short current between the conductive regions is stopped.

Conversely, where coupling the selected region to the fifth voltage via a respective known resistance, and the region having a voltage in the reference voltage range to a sixth voltage provides a voltage of the selected region lying in a second reference voltage range, the article may be considered to be a power consuming electrical device coupled across the selected region and the region having a voltage falling within the second reference voltage range. If the potential differences defined by the first and second voltages on one hand and the fifth and sixth voltages on the other are the same, the corresponding second reference voltage ranges will be the same as the first voltage ranges. Where other test voltages are selected, the corresponding first and second reference voltage ranges may vary accordingly.

Where this determination is made, the coupling interface may then be further adapted to couple the voltage of the selected region to the third voltage and to couple the region having a voltage corresponding to a respective the reference voltage range, to the fourth voltage, where the difference between the third voltage and the fourth voltage corresponds to a preferred supply voltage associated with the respective specified class of electrical device as discussed above.

In a scenario where the first voltage is greater than the second, the sixth voltage will be greater than the fifth voltage, in order to impose the specified polarity reversal. If the coupling of the first voltage to the selected conductive region and the second voltage to the further conductive region gave rise to a high voltage drop indicating a high current through the article coupled across these regions, the article may either be a basic battery drawing a high current in a charging mode, or may simply be a short circuit. If the sixth voltage is equal to the second voltage and the fifth voltage is equal to the first voltage, the potential difference across the two conductive regions in each case will be equal, but of opposite polarity. With the sixth voltage coupled to the further conductive region and the fifth voltage coupled to the further region it may be expected that a much lower current will flow, and correspondingly a smaller voltage drop (in the presence of the same potential difference) will be visible, it can be deduced that the article represents specified class of electrical device. Accordingly, if the potential differences defined by the first and second voltages on one hand and the fifth and sixth voltages on the other are the same, the corresponding reference range in the first case will be greater than the second voltage range. Where other voltages are selected, the corresponding reference ranges and second voltage ranges may vary accordingly.

The reference ranges (and correspondingly the second ranges) may be defined on the basis of detailed knowledge of the behavior of different devices in a forward or charging power connection condition. The third range may be defined on the basis of the behavior of different devices in a reverse power connection condition, or alternatively or additionally on the basis of the behavior of coupling adapters as discussed below in a reverse power connection condition Although, as discussed above, it may be possible to distinguish certain devices on the basis of their behavior in response to a reversal of voltage polarity, either due to an inherent tendency to draw a greater current when coupled in one polarity than in the other, in other cases, it may be desirable to provide a coupling adapter between the device and the conductive regions comprising circuitry configured to ensure such a detectable response.

On this basis, the interface may select in turn each conductive region, and measure each other region first with one polarity, then with the opposite polarity if the first characteristic is detected, before proceeding to select a new conductive region and measure each other region with respect to the newly selected region, until every region has been tested with respect to every other region.

The measurement of the voltage of each conducting region may be performed by any convenient method. For example, it may be measured by Analog to digital converters, moving coil galvanometer, hall effect sensor or otherwise.

As described above many devices may be inherently detectable either on the basis of their characteristic voltage drop. This voltage drop may arise due to the inherent properties of the device itself, or otherwise be determined by the inclusion of a resistance in the device or a coupling adaptor coupled across the two electrodes. As such, the coupling of such a device across two conductive regions established a potential divider circuit permitting the convenient measurement of the voltage drop across the device and accordingly the identification thereof. Still further in an enhanced mode presuming a difference in behavior depending on the polarity of the voltage across a device—specifically, a first characteristic voltage drop with one polarity, and a second characteristic voltage drop with the opposite polarity. While in some cases this differential behavior may arise from the characteristics of the device itself, in other cases it may be desirable to provide an additional electronic circuit adapted to perform a first anti-inversion of current function between the first electrode and the second electrode In some embodiments for example as discussed below there may be provided additional electrodes for data or power connections, in which case additional anti inversion behavior may be implemented between some or all pairs of such additional electrodes.

Where no such difference is detectable, any voltage drop detected may be presumed to be due to a spurious connection not corresponding to a power consuming electrical device due to a short circuit or resistive electrical connection across the two conductive regions for example. If different characteristics are detectable, the conductive article is presumed to be a chargeable device.

While the preceding approach is described as treating all conductive regions sequentially, it will be appreciated that a set of conductive regions may be broken into a number of subsets, with each the respective subsets operating in parallel. This may be more effective where a large number of conductive regions are managed.

This characteristic behavior in the face of different electrical conditions implies certain characteristics in a power consuming electrical device enabling it to be distinguished from a spurious connection not corresponding to a power consuming electrical device. These characteristics may be achieved by including certain electronic components in power consuming electrical device itself, or in an interface token positioned between (in an electrical sense) the power consuming electrical device and the conductive regions.

The coupling interface may act as a front end for coupling of devices to power from solar panels, battery packs, mini wind turbines, mains electricity either directly or rectified to DC and/or reduced to any desired voltage, and other power supply units, via the conductive regions.

Figure 4:
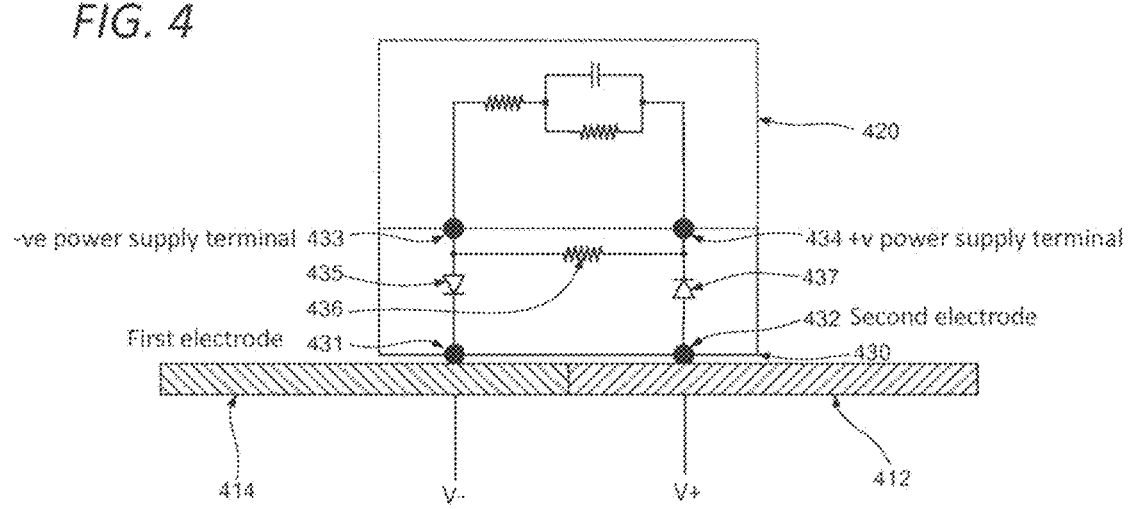
FIG. 4 shows a first coupling arrangement suitable for use in accordance with certain embodiments.

FIG. 4 shows a first coupling arrangement suitable for use in accordance with certain embodiments.

As shown, a coupling arrangement 430 comprises a first terminal 431 in contact with a first conductive region 414 and a second terminal 432 in contact with a second conductive region 412. The first conductive region 414 may correspond to the conductive region 314 as described with reference to FIG. 3 above at the moment the conductive region 314 is selected as the first conductive region, And the second conductive region 412 may correspond to the conductive region 312 as described with reference to FIG. 3 above at the moment the conductive region 312 is selected as the second conductive region. The coupling arrangement 430 furthermore comprises a negative power supply terminal 433 and a positive power supply terminal 434. The negative power supply terminal 433 and a positive power supply terminal 434 provide a connection to the circuits of an apparatus 420 which may correspond to the apparatus 120, 320 as described above. The circuits in question may be any circuit able to draw current from the terminals 433, 434, either to energize the operational circuits of the device, or to charge an internal battery of the device, or both. FIG. 4 presents device 420 as comprising an equivalent circuit for a cell based on the a simplified Randle's cell circuit by way of example, but the detailed content of the device itself is outside the scope of the present invention. In any event, in certain embodiments a final objective may be to charge such a cell via the coupling interface and the conductive regions.

In accordance with the discussion of FIG. 3, a device disposed across the conductive regions 412, 414 is expected to exhibit certain electrical characteristics.

Specifically, a characteristic of the voltage between the first conductive region and the second conductive region in the presence of a potential difference of a given polarity coupled across the first conductive region and the second conductive region is expected to differ in a predetermined manner from the characteristic of the electrical property between the first conductive region and the second conductive region in the presence of a potential difference of an opposite polarity coupled across the first conductive region and the second conductive region.

More particularly, this may be achieved by a coupling arrangement providing an anti-inversion effect.

FIG. 4 presents one example of a circuit achieving such an effect. As shown, the coupling arrangement 430 comprises a first diode 435, the cathode of the first diode 435 being connected to the first electrode 431, a resistor 436 connected across the negative supply terminal 433 and the positive power supply terminal 434. Meanwhile, a second diode 437 is connected with the anode of the second diode being connected to the second electrode 432. The resistance of the resistor 436 may be selected as being in a similar range to the typical internal equivalent resistance of the device 420. In certain embodiments the interface controller may be adapted to select a resistance from a range of available values in an adaptive manner in response to the detected characteristics of the device, for example starting with a high resistance and progressively reducing the resistance until a value providing good discrimination is found.

Accordingly, on the basis of the connections shown, with the first conductive region 414 being coupled to a positive voltage and the second conductive region coupled to ground, one can expect a current to flow through the second diode 437, the resistor 436 and the first diode 435. The exact level of the current that flows will depend on the value of the resistor 436 and the equivalent internal resistance of the device 420, however it is presumed that the value of resistor 436 will be selected so as to provide a current falling within a predictable range of current values in the presence of a an arrangement as shown (although the measured value may rise over time to arrive at this value).

If on the other hand the polarity of the potential difference between the first and second conductive regions is reversed, for example by inverting the voltages on these respective conductive regions, no (or a much smaller) current should flow, in view of the properties of the diodes 435 and 437.

As such, the voltage drop may constitute the electrical property considered by the interface of FIG. 3 for example, such that a voltage drop between the first conductive region and the second conductive region in the presence of a positive potential difference coupled across the first conductive region and the second conductive region is expected to be substantially greater than the voltage drop between the first conductive region and the second conductive region in the presence of a negative potential difference across the first conductive region and the second conductive region.

Figure 5:
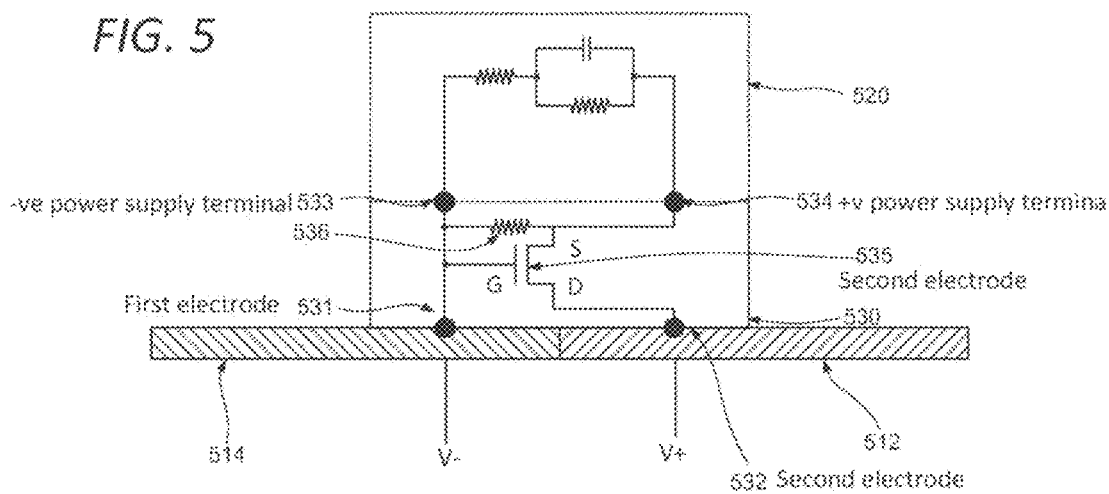
FIG. 5 shows a second coupling arrangement suitable for use in accordance with certain embodiments

FIG. 5 shows a second coupling arrangement suitable for use in accordance with certain embodiments.

As shown in FIG. 5, a coupling arrangement 530 comprises a first terminal 531 in contact with a first conductive region 514 and a second terminal 532 in contact with a second conductive region 512. The first conductive region 514 may correspond to the conductive region 314 as described with reference to FIG. 3 above at the moment the conductive region 314 is selected as the first conductive region, and the second conductive region 512 may correspond to the conductive region 312 as described with reference to FIG. 3 above at the moment the conductive region 312 is selected as the second conductive region. The coupling arrangement 530 furthermore comprises a negative power supply terminal 533 and a positive power supply terminal 534. It will be appreciated that the negative terminal may in fact expect a ground connection references to negative connections, terminals, electrodes, voltages and the like should be understood to include 0V, or a ground connection. The negative power supply terminal 533 and a positive power supply terminal 534 provide a connection to the circuits of an apparatus 520 which may correspond to the apparatus 120, 320, 420 as described above.

In accordance with the discussion of FIG. 3, a device disposed across the conductive regions 512, 514 is expected to exhibit certain electrical characteristics as discussed with respect to FIG. 4.

FIG. 5 presents a further example of a circuit demonstrating these characteristics. As shown, the coupling arrangement 530 comprises a MOSFET 535, the source of the MOSFET 535 being connected to the positive supply terminal 433, the gate of the MOSFET 535 being connected to the first electrode 531 and negative supply terminal 533 and the drain of the MOSFET 535 being connected to the second electrode 532 and the positive power supply terminal 534. Meanwhile resistor 536 is connected across the negative supply terminal 533 and the positive power supply terminal 534. The resistance of the resistor 536 may be selected as being in a similar range to the typical internal equivalent resistance of the device 520.

Accordingly, on the basis of the connections shown, with the first conductive region 514 being coupled to a positive voltage and the second conductive region coupled to ground, one can expect the channel of the MOSFET 535 to open allowing a current to flow through from the source to the drain, through the resistor 536. The exact level of the voltage drop across the resistor will depend on the value of the resistor 536 and the equivalent internal resistance of the device 520, however it is presumed that the value of resistor 536 will be selected so as to provide a voltage drop falling within a predictable range of values in the presence of a an arrangement as shown.

If on the other hand the polarity of the potential difference between the first and second conductive regions is reversed, for example by inversing the voltages on these respective conductive regions, no (or a much smaller) current should flow, in view of the properties of the MOSFET 535, the channel of which will remain closed if coupled to ground (assuming the MOSFET 535 is an N MOSFET device).

Use of a MOSFET device to provide the desired device characteristics is advantageously simple, reliable and inexpensive.

As such, the voltage drop may constitute the electrical property considered by the interface of FIG. 3 for example, such that a voltage drop between the first conductive region and the second conductive region in the presence of a positive potential difference coupled across the first conductive region and the second conductive region is expected to be substantially greater than the current between the first conductive region and the second conductive region in the presence of a negative potential difference across the first conductive region and the second conductive region.

It will be appreciated that there are many other circuit configurations that can be provided to achieve the same desired characteristic, based on P MOSFETs, multiple MOSFETs, or many other possible arrangements as may occur to the skilled person.

It will be appreciated that the general approach discussed above with respect to FIG. 3 may be extended to provide an enriched understanding of articles disposed across the conductive regions. In particular, it will be appreciated that in the context of the present invention, various different situations may arise, such as:

A. Any given pair of conducting regions may be connected by a low resistance or short circuit, for example where a metallic ornament or tool is placed in contact with both regions;

B. Any given pair of conducting regions may be isolated from each other (this is the default condition where no article is present);

C. An electrical device susceptible to electrical connection via the coupling device may be coupled across the regions with its terminals in one orientation (positive to positive conductive region, negative to negative conductive region) or D. An electrical device susceptible to electrical connection via the coupling device may be coupled across the regions with its terminals in one orientation (negative to positive conductive region, positive to negative conductive region).

Embodiments of the invention are able to distinguish some or all of these scenarios as discussed in more detail below.

FIGS. 6a to 6d explore a number of scenarios that may be distinguished on the basis of certain embodiments. In each of these figures there is presented schematically a simplified version of the arrangement of FIG. 3, comprising four conductive regions 611, 612, 613, 614. As shown, each of these four conductive regions is switchably coupled either to ground via a respective resistance, or to 5V. As shown, in each case the conductive region 613 is coupled to 5V and the other regions coupled to ground via a respective resistance.

Figure 6A:
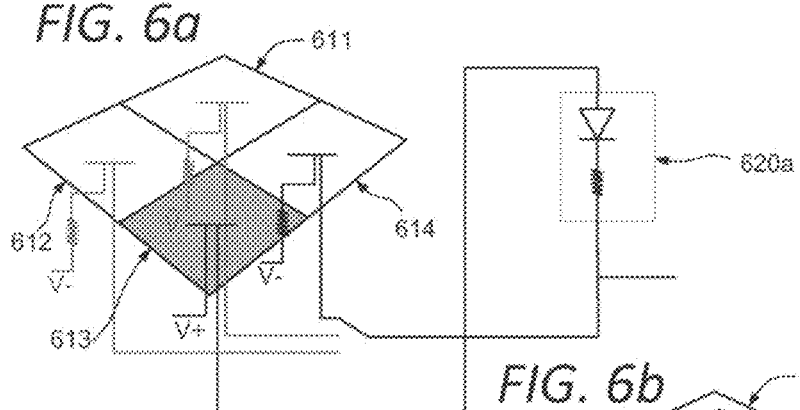
FIG. 6a shows a first scenario in accordance with certain embodiments.

FIG. 6a shows a first scenario in which a coupling arrangement 620a as discussed above is coupled across the conductive region 613 and the conductive region 614 in a configuration corresponding to scenario C above. Specifically, the coupling arrangement 620a, represented schematically here by a resistance and diode in series with the anode of the diode connected to conductive region 614 and the resistance connected to the conductive region 613. Accordingly, no (or little) current can flow through the diode from positive conductive region 613 to negative conductive region 614 in view of the diode characteristics. In the configuration of FIG. 6, this small current flow may be detected by measuring a voltage drop across the known resistance coupling conductive region 614 to ground.

Figure 6B:
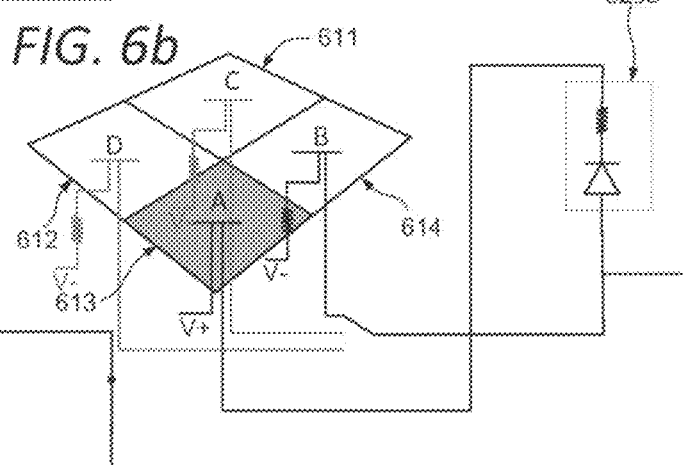
FIG. 6b shows a second scenario in accordance with certain embodiments.

FIG. 6b shows a second scenario in which a coupling arrangement 620b as discussed above is coupled across the conductive region 613 and the conductive region 614 in a configuration corresponding to scenario D above. Specifically, the coupling arrangement 620b, represented schematically here by a resistance and diode in series with the anode of the diode connected to conductive region 613 and the resistance connected to the conductive region 614. Accordingly, current can flow through the diode and resistance from positive conductive region 613 to negative conductive region 614 in view of the diode characteristics.

The scenarios of FIGS. 6a and 6b correspond to the two states in which any article will be assessed as discussed above. That is, the voltage drop across the first conductive region (taking the situation of figure a as a starting point by way of example) and the second conductive region in a first state is determined to differ in the presence of a potential difference of a first polarity coupled across the first conductive region and the second conductive region by the switching operation of the coupling interface in a predetermined manner (in this case, the voltage drop n the first state is much lower than in the second state, and this may be used here as the differentiating factor) to voltage drop between the first conductive region and the second conductive region in a second state (the situation of FIG. 6b) in the presence of a potential difference of an opposite polarity coupled across the first conductive region and the second conductive region by the switching operation of the coupling interface. On this basis, an article is considered to be coupled between the first conductive regions and the second conductive region and to constitute an electrical device susceptible to electrical connection via the coupling device where this difference in the predetermined characteristic is found to exist. It will be understood that in the first state the polarity may be positive (i.e. the voltage of the first selected conductive region is higher than the voltage of the further conductive region) and in the second state the polarity may be negative (i.e. the voltage of the first selected conductive region is lower than the voltage of the further conductive region), or vice versa.

Figure 6C:
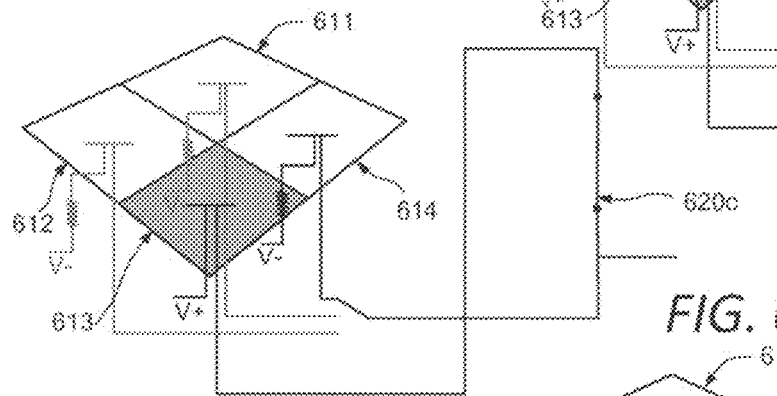
FIG. 6c shows a third scenario in accordance with certain embodiments.

FIG. 6c shows a third scenario in which a short circuit 620c is coupled across the conductive region 613 and the conductive region 614 in a configuration corresponding to scenario A above. Accordingly, current can flow through the circuit from positive conductive region 613 to negative conductive region 614.

Figure 6D:
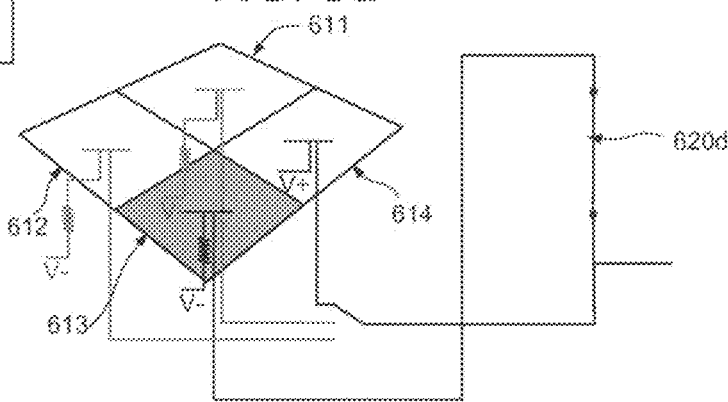
FIG. 6d shows a third scenario in accordance with certain embodiments.

FIG. 6d shows a third scenario in which a short circuit 620d is coupled across the conductive region 613 and the conductive region 614 in a configuration corresponding to scenario A above. In the case of FIG. 6d however, the polarity of the voltage across the two conductive regions has been reversed, so that conductive region 614 is at 5V and conductive region 613 is coupled to ground via a resistance. Accordingly current can flow through circuit from positive conductive region 614 to negative conductive region 613.

The scenarios of FIGS. 6c and 6d correspond to the two states in which any article will be assessed as discussed above. That is, the voltage drop across the first conductive region (taking the situation of FIG. 6c as a starting point by way of example) and second conductive region in a first state is determined to differ in the presence of a potential difference of a first polarity coupled across the first conductive region and the second conductive region by the switching operation of the coupling interface in a predetermined manner (in this case, the voltage drop in the first state should be much lower than in the second state, and this may be used here as the differentiating factor, however in the case of FIGS. 6c and 6d this difference is not present, since the voltage drop in each direction will generally be the same or similar) to a voltage drop across the first conductive region and the second conductive region in a second state (the situation of FIG. 6d) in the presence of a potential difference of an opposite polarity coupled across the first conductive region and the second conductive region by the switching operation of the coupling interface. On this basis, an article is considered to be coupled between the first conductive region and the second conductive region but not to constitute an electrical device susceptible to electrical connection via the coupling device where this difference in the predetermined characteristic is found to exist. As discussed hereafter, such a finding may nevertheless prompt the coupling interface to establish of persistent electrical connections to the respective conductive regions by the switching operation for example by setting the corresponding regions to a floating or high resistance condition.

In some cases the voltage drop across the first conductive region and the second conductive region in the first state may be determined to have a value falling within a predetermined set of values, but the characteristic in the first state is determined not to differ in the predetermined manner to the voltage drop in the second state. Where this is the case the interface may to consider an article to be coupled between the conductive regions in the given combination, but to consider the article not to constitute an electrical device susceptible to electrical connection via the coupling device.

In such a situation, the coupling interface may be adapted in a case where the article is determined to be a conductive article creating a short circuit between the first conductive region and the second conductive region, to couple the first conductive region and the second conductive region to a common voltage. This common voltage may be ground, or any other voltage, on the basis that whatever voltage is selected, if it is the same in both regions across which the article is coupled, no current will flow through the article.

Figure 6E:
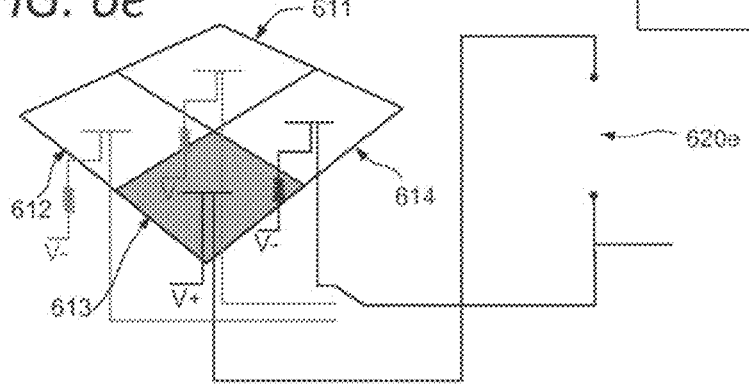
FIG. 6e shows a fifth scenario in accordance with certain embodiments.

FIG. 6e shows a fourth scenario in which an open circuit 620e exists across the conductive region 613 and the conductive region 614 in a configuration corresponding to scenario B above. Accordingly no current can flow through the circuit from positive conductive region 614 to negative conductive region 613. If the polarity is reversed between the two conductive regions, the situation will be the same.

The scenario of FIG. 6e and the corresponding situation with reversed polarity (not shown) correspond to the two states in which any article will be assessed as discussed above. That is, a voltage drop across the first conductive region (taking the situation of FIG. 6e as a starting point by way of example) and the second conductive region in a first state is determined not to fall within a predetermined range (for example, greater than zero) to differ in the presence of a potential difference of a first polarity coupled across the first conductive region and the second conductive region by the switching operation of the coupling interface in a predetermined manner (in this case, the voltage drop in the first state should be much lower than in the second state, and this may be used here as the differentiating factor, however in the case of FIGS. 6c and 6d this difference is not present, since the current in each direction will generally be the same or similar) to the voltage drop between the first conductive region and the second conductive region in a second state (the situation of FIG. 6e with reversed polarity) in the presence of a potential difference of an opposite polarity coupled across the first conductive region and the second conductive region by the switching operation of the coupling interface. On this basis, no article is considered to be coupled between the first conductive region and the second conductive region, since not only did the values in the two states not differ, but in at least one case the value was determined to lie outside the predetermined acceptable range.

It will be appreciated that in some cases, it may not be necessary to measure the short circuit with both polarities. The resistance 436 or 536 will have a predictable and measureable effect on the current drawn by the device, which makes it possible to distinguish between the presence of the device in a forward biased mode and a short circuit. Even if the resistance is omitted, it may be possible to determine the presence of the adapter on the basis of the voltage drop characteristic of a diode which may be distinguished from the short circuit situation. It may also be possible to distinguish the circuit in a reverse biased mode from an open circuit on the basis of the breakdown voltage characteristic of the diode. Where this is the case, the coupling interface may be adapted to proceed for a given combination of conductive regions to the second state only in a case where the voltage drop between the first conductive region and the second conductive region in the first state is determined to have a value falling within a predetermined set of values, and in a case where the characteristic is determined to have a value not falling within a predetermined set of values, to consider no article to be coupled between the conductive regions in the given combination.

As discussed hereafter, a determination that no article is coupled between the conductive regions in the given combination such a finding may nevertheless prompt the coupling interface to establish of persistent electrical connections to the respective conductive regions by the switching operation for example by setting the corresponding regions to a floating or high resistance condition.

While FIGS. 4, 5 and 6 have been discussed primarily in the context of an article coupled between two conductive regions, it will be appreciated that many more conductive regions may be present, and articles may be coupled across any pair of these conductive regions. As such, the principles presented above may be applied across any number of conductive regions. In particular, the coupling interface may comprise a controller configured to sequentially select each the region, and to measure a respective electrical property of each of the plurality of regions with respect to the selected region.

It will be appreciated that in certain scenarios the difference in the characteristic of the electrical property in the presence of the potential difference with the first polarity with respect to the characteristic of the electrical property in the presence of the potential difference with an opposite polarity may occur instantaneously due to transient effects. For example, mechanical vibrations, possibly due to the situation of an arrangement in accordance with the invention in a vehicle or the like, may cause the article 420, 520 to maintain only sporadic contact with the conductive regions. In the case where the article is a spurious conductive article, such vibrations may nevertheless lead a voltage drop falling within the first (and as the case may be second) reference voltage range leading the coupling interface to mistakenly identify the article as an electrical device susceptible to electrical connection. Similar effects may arise due to other oscillations or transient effects, for example due to electrical resonances and the like. Accordingly, the coupling interface according to certain variants may oscillate between the first state and the second state a plurality of times, so as to obtain multiple measurements, with a view to excluding such transient conditions. These multiple measurements may be performed with a predetermined timing selected so as to represent a sampling frequency sufficient to distinguish oscillations in a range of likely oscillation frequencies. As such, the respective electrical property may be measured at each oscillation, and in a case where the electrical property for any region exhibits a first predetermined characteristic consistently over the plurality of oscillations, considering the article to be coupled across the selected region and the region exhibiting the first characteristic.

The foregoing embodiments provide a convenient mechanism for establishing an electrical connection between the coupling interface and an article identified as an electrical device susceptible to electrical connection coupled across two conductive regions controlled by the coupling interface.

In addition to the scenarios A, B, C and D as discussed above, for example with reference to FIG. 6, is will be appreciated that other scenarios may be addressed by a coupling interface in accordance with certain embodiments. For example, it may be imagined that a variety of different classes of electrical devices susceptible to electrical connection may be defined, and the coupling interface may be defined not only to distinguish such devices from short and open circuit situations as described above, but also to distinguish devices of one class from another, and furthermore to establish connections in a differential manner on the basis of this determination. One manner in which devices of one such class may differ from devices of other classes may be in terms of power supply requirements, as defined for example in terms of voltage, AC/DC, maximum current, and the like. Accordingly, the coupling interface may be adapted to determine the class of a detected device, and to then supply the corresponding conductive regions with power in a manner corresponding to those requirements.

As described above, devices are distinguished on the basis of their characteristic voltage drop. As also mentioned above, certain devices have a characteristic response that evolves over time in response to exposure to a potential difference.

Figure 7:
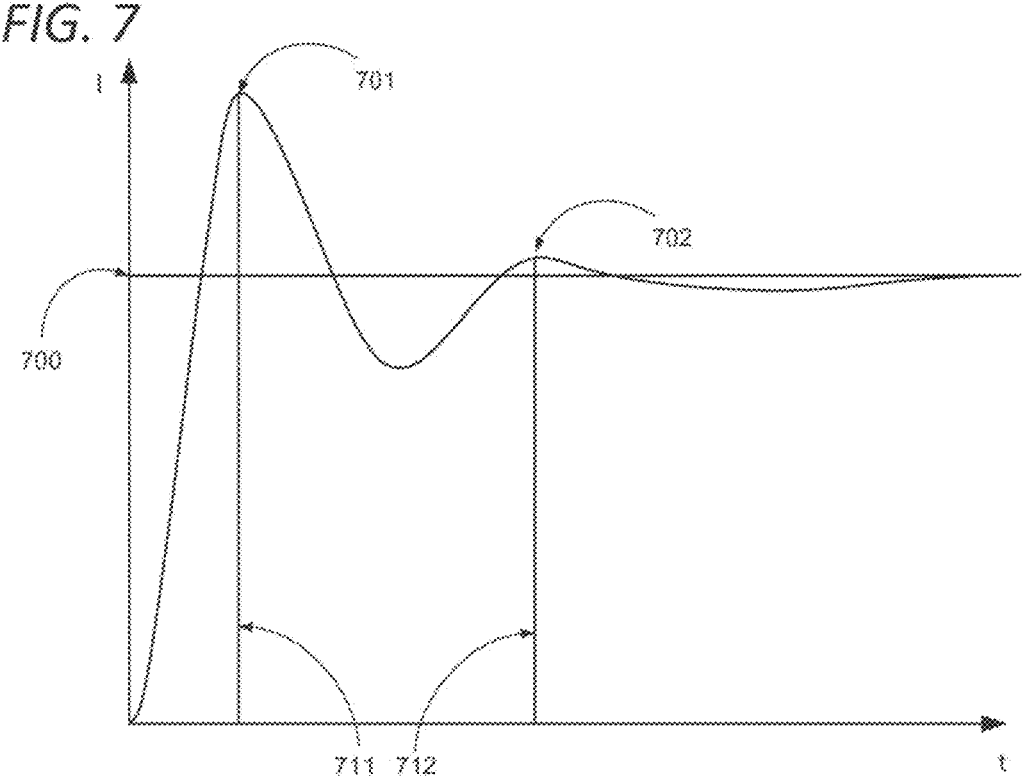
FIG. 7 shows a typical reaction of a cell to entry into a charging state.

FIG. 7 shows a typical reaction of a cell to entry into a charging state.

In particular, FIG. 7 shows a plot of the current drawn by the cell as it begins to charge against time. As can be seen, the current rapidly rises from zero to a first peak 701 at time 711, before falling to a minimum, then rising to a second peak 702 at time 712, and so on until a stable state 700 is reached, representing a resonant ringing in a step response. This response can be described in terms of various parameters such as times 711 and 712, current value 700, the difference between the peak currents 701 and 702 and the stable value 700, and so on. When an article is coupled across two conductive regions, and these regions are exposed to a potential difference as discussed above, the coupling interface may be adapted to measure the electrical property at a plurality of instants in time for a given combination of conductive regions to obtain a chronological evolution pattern of the electrical property, and to compare the chronological evolution to one or more reference evolution patterns, each reference evolution pattern corresponding to a specified class of electrical device, and in a case where the chronological evolution pattern corresponds to a respective reference evolution pattern, considering the article coupled across the selected region and the region exhibiting the first characteristic to be an example of the respective specified class of electrical device.

On this basis, whatever mechanism us used to identify a device or class of devices, the coupling interface may then proceed to supply the corresponding conductive regions with power in a manner corresponding to the requirements of the device or class of device. The power requirements may be deduced from the measured values themselves, or by retrieving device class details from memory on the basis of the measured values, and coupling the conductive regions on the basis of the retrieved details. That is to say, the coupling interface may be further adapted to couple the first conductive region to a first voltage and to couple the second conductive region to a second voltage, where the difference between the first voltage and the second voltage correspond to a preferred supply voltage associated with the respective specified class of electrical device. Typically, the coupling interface might be configure to distinguish device requiring a 5V DC power supply, a 12V DC power supply and a 20V DC power supply, and to connect the respective conductive regions to 5V, 12V, 20V or ground so that each electrode of the or each article is connected, with the correct polarity, to the correct voltage.

The response for a particular battery may be tuned by in introduction of additional circuits such as filter circuits, which may partially or fully attenuate the ringing effect, or modify its form. Such circuits may be introduced with specific characteristics as a means to support clearer discrimination between devices.

While the foregoing embodiments have been described in the context of two electrodes in contact with the conductive regions, other embodiments may comprise any number of electrodes greater than one. These electrodes may correspond to power connections for example as described above, or may additionally comprise data connections. For example, many nomadic devices which may constitute electrical device susceptible to electrical connection via the coupling interface may be provided with USB type connections, with +5V and 0V power connections, and two data connections.

Figure 1:
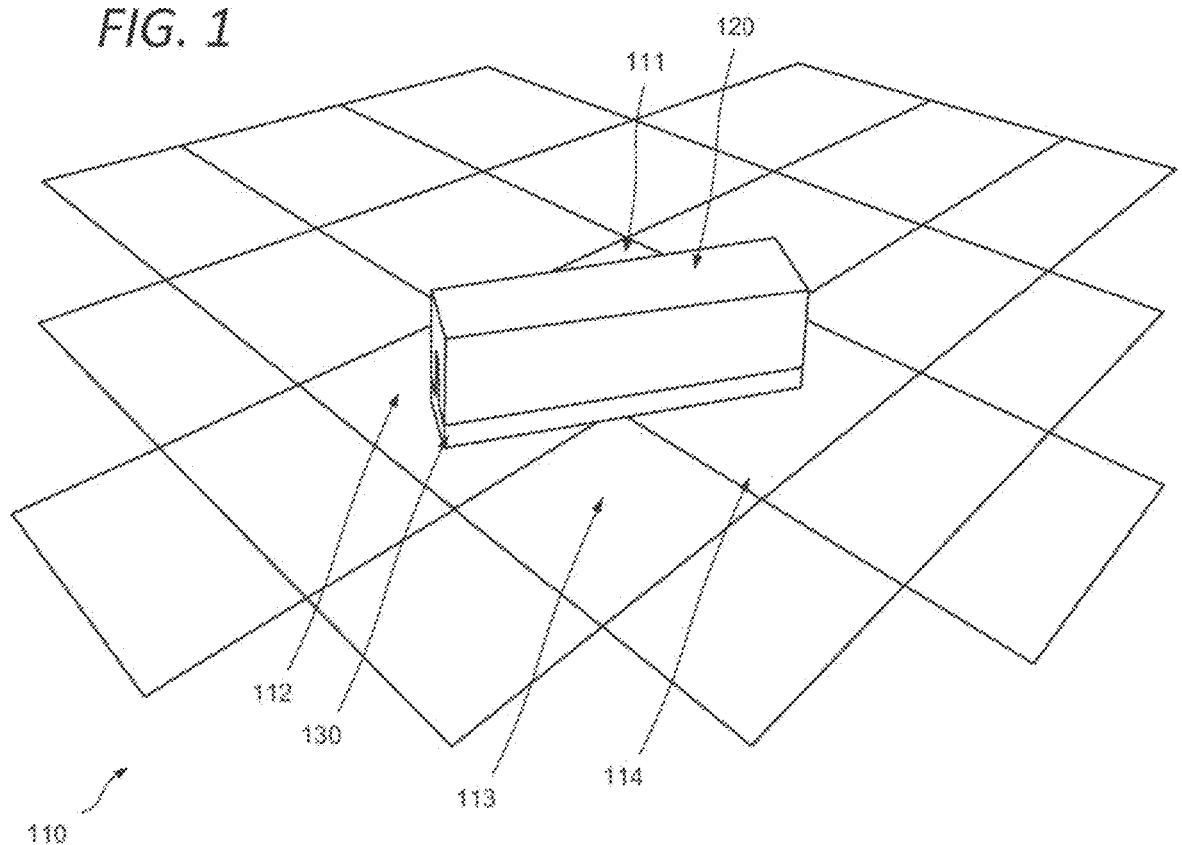
FIG. 1 presents aspects of the prior art approach provided by WO2017046458.
Figure 2:
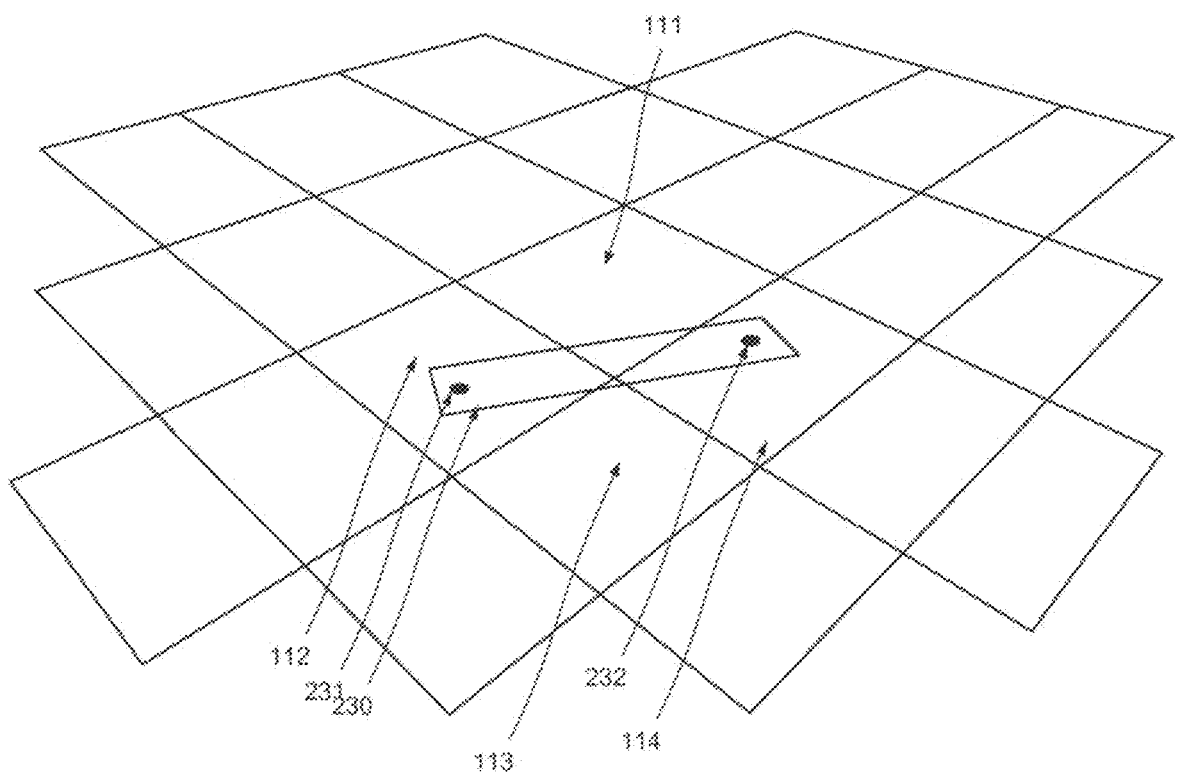
FIG. 2 presents aspects of the prior art approach provided by WO2017046458 in further detail.
Figure 8:
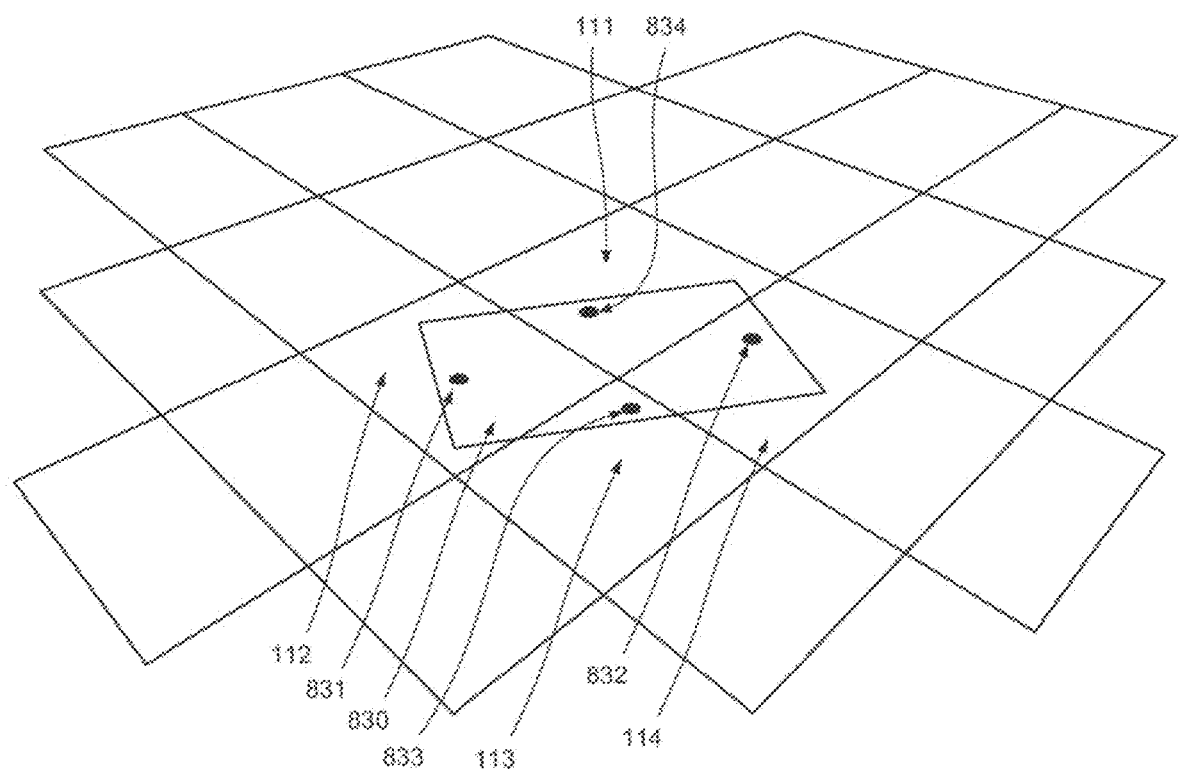
FIG. 8 represents a variant of the coupling arrangement of FIG. 2 according to some embodiments of the invention.

FIG. 8 represents a variant of the coupling arrangement of FIG. 2 according to some embodiments of the invention.

The coupling arrangement 830 of FIG. 8 comprises electrodes (i.e. electrical contact areas) 831, 832, 833, 834 that are configured to respectively mate with conductive regions 111, 112, 113, 114 as presented above. Electrodes 831, 832 may correspond to the electrodes 231, 232; 431, 432; or 531, 532; respectively and as such may be used to detect and optionally identify the device or class of device as discussed above. The additional connections 833, 834 may be connected to data circuits, or additional power circuits (for example where a device requires multiple power supply voltages). In certain embodiments, each pair of electrode may be detected independently on the basis of the approached described above, which may imply the provision of a coupling arrangement circuit for example as discussed with reference to FIG. 4 or 5 for each pair of electrode. In other cases, since for a given class of device, the relative disposition of all of the electrodes is predetermined, once a first pair of electrodes has been detected in accordance with the approaches described above, the presence and disposition of the remaining electrodes may be deduced from the device type. For example, where a particular device or class of devices can be identified, for example as described above, the coupling interface may retrieve data specifying the disposition of the remaining electrodes. With reference to the disposition of the conductive regions, it is possible then to determine which conductive regions should be situated in contact with additional electrodes, and couple them on the interface side accordingly. For example, in the case where the an additional pair of electrodes 834, 835 is provided, and the retrieve data indicates that these are situated in the same plane as the first electrodes 831, 832, on an axis perpendicular to the axis on which the first electrodes 831, 832 are situated, the two axes crossing at their respective centers, the electrodes of the second pair both being positioned at a distance from the axis of the first electrodes 831, 832 equal to half the distance between the first electrodes 831, 832, it is possible to determine on the basis of the known geometry of the conductive regions that the conductive regions 111 and 113 must fall beneath the electrodes 833 and 834 respectively. In any case, the approaches described above permit the detection of short circuits in relation to data terminals in the same way as for power terminals, and their corresponding management.

This may be assumed to be true based on the imposition of known geometries for the layout of the conductive regions and the electrodes such that this is always true. In alternative approaches, in a case where the geometric specification means that for a given location of the first pair of electrodes in a particular pair of conductive regions, the further electrodes may fall in any of a number of possible further conductive regions, additional measurements may be performed on those possible further regions where the further electrodes may be located to determine the existence of such connections. In a case where these further electrodes are provided with coupling adapter circuitry as described above, such measurements can be performed on the basis of the same approach as used for the detection of the first electrodes. In another alternative, a further detectable electrode may be provided to provide a more explicit frame of reference for the deduction of the position of further electrodes. For example in the arrangement of FIG. 8 a fifth electrode such as a second ground connection for example may be provided in order to know 3 of the 5 regions that are connected and to deduce the position of the electrodes 833 and 834.

If in the case of this example the retrieved information furthermore indicates that the additional electrode 833, 834 correspond to USB Data− and USB Data+ connections respectively, the coupling interface may control switching components to couple these electrodes to respective USB bus channels belonging to the coupling interface. As such, the coupling interface may be further adapted to establish one or more data connections between an information handling system and one or more respective the conductive regions, wherein the respective conductive regions with respect to which data connections are established are selected as having a predetermined spatial relationship to the first conductive region and the second conductive region. The predetermined spatial relationship may be retrieved as a function of the respective specified class of electrical device.

As such, the switches 301 of FIG. 3 might be adapted to comprise additional switching positions corresponding to different power supply values (e.g. different voltages), and/or one or more data bus lines, as required to enable the data connection requirements of supported devices.

While as discussed above the coupling interface controls connections to the conductive regions as a separate entity, the coupling interface may also be integrated with the conductive regions in a discrete article. For example, the conductive regions may form part of a table, mat, tablet or the like, and the coupling interface may be integrated in this same article. As such, the coupling interface may comprise the plurality of conductive regions.

As discussed above, the coupling interface may manage a large number of conductive regions. Furthermore, any number of conducting articles, some or all of which may be electrical devices susceptible to electrical connection, may be present in electrical contact with different conductive regions. It may be desirable for the coupling interface to manage each conductive region so as to couple it to the proper voltage channel, data bus or otherwise as appropriate to the class of device and the disposition and role of its electrodes. In order to achieve this, the coupling may comprise or have access to a memory, and be adapted to store values in the memory defining for each conductive region a relationship with each other conductive region.

Possible such relationships include, for each conductive region with regard to each other conductive region:

a) in low resistance connection to,
b) providing current to, or
c) receiving current from.

This information may be obtained by the detection and deduction processes described above, for example with reference to FIG. 6, so that the coupling interface is adapted to determine and store each relation in the memory, and may furthermore be adapted to couple each conductive region to a voltage in accordance with any preceding claim as a function of the stored relationships.

It will be appreciated that this data may conveniently be seen as a table. The table below reflects the situation shown in FIG. 3 by way of example:

|  |  | Object conductive region | | | |
| --- | --- | --- | --- | --- | --- |
|  |  | 311 | 312 | 313 | 314 |
| Subject | 311 |  |  |  |  |
| conductive | 312 |  |  |  | b |
| region | 313 |  |  |  |  |
|  | 314 |  | c |  |  |

In this example no entry is made for regions that are isolated from the other conductive regions, although such entries might also be envisaged. Where other relationships are managed, for example with data connections or multiple voltage power connections, additional status values may be provided.

It will be appreciated that it may well occur that a given conductive region is both in a short circuit condition with respect to one or more further conductive regions, and also either providing current, or receiving current to a device for example, if one electrode is touching two conductive regions at the same time. In other words, a given cell may be in scenario a) and scenario b) or c). Where this is the case, all of the shorted conductive regions are set to the same positive supply voltage (say 5v) or negative supply voltage (say 0v) together.

The procedures described above for the detection and identification of devices may be repeated cyclically in order to regularly update the table or other stored data representing the relations between the respective conductive regions. A refresh may alternatively or additionally be triggered by one or more of a change in current drawn by all conductive regions, or by some other sensor, such as a optical sensor, a pressure sensor, an inductive sensor or any other means capable to determining a change in the number or configuration of devices on the conductive regions. The coupling status of each conductive region may be updated each time the data are refreshed, or when a value is changed, or otherwise.

In a variant of certain embodiments, one or more coupling interfaces as described herein may be provided with communications interfaces whereby the coupling interfaces may communicate the status of the conductive regions they control. Still further, where the coupling interfaces identify a device, either on the basis of its electrical properties of the device or associated coupling adapter as discussed above, or in a case where the coupling interface supports the establishment of data connections for example as described with reference to FIG. 8, or otherwise, for example by means of some additional communication channel such as WI-FI™, Near Field Communication (NFC) channel, Bluetooth™, Visible Light Communication, infrared etc. Such additional communication channels may be used for the transfer of data to general data handling systems such as local storage or network interfaces for example as discussed with reference to FIG. 11 or 12, or may additionally or alternatively support further embodiments of the invention. For example, communications between a connected devices and the coupling interface may be used to authorise or configure a power connection, to communicate predicted charge duration either to or from the device, or charge completion information from the device. Information that might be submitted by a connected device may include an identifier of the device, of a device user, schedule information, current charge level information, charging characteristics information, power consumption information, device capabilities or installed software information, account log in information and the like. Schedule information may be used by the coupling interface to determine the expected available charge time, and to prioritise devices whose connection time is expected to be short.

By communicating with a device via such data connections, the coupling interface may communicate the presence of that device, and/or any user, company or other entity associated with that device, or other data shared by the device. By sharing such information, the location of a device or its user for example may be obtained within a space where other location technologies may not function satisfactorily may be determined. Location through the coupling interface may be coupled with one or more of the many approaches available. For example, determining the position of three corners of a rectangular shaped coupling interface in Longitude, Latitude, Altitude format makes it possible to locate very precisely each device coupled with coupling interface. In addition positioning systems such as GNSS which do not function indoor or Bluetooth with insufficient precision for some applications may be augmented by the availability of such data. In particular, knowing which electrodes are connected may make it possible to determine which one it is. If voltage/current are known for particular electrodes a more precise or reliable determination may be made, which may still further be supported by data provided by the device by other channels. If a device or device class has been identified, additional information for that device or class of devices may be obtained e.g. from a lookup table or database, defining for example its precise geometry. On this basis the geometry and the position of the connected electrodes of the device would be known in relation to the position of the connected electrode or electrodes on the surface. The geometry of the surface and the position of the electrode and the alignment of the mat relative to an absolute positioning coordinate system such as Lat, Long, Alt can then be used to obtain the location of the device to a high degree of precision. This information may then be shared with the device by any convenient communication means such as WIFI, NFC, etc. as discussed above.

In a further embodiment, the interface controller may be adapted to determine with respect to a device or class of device as identified in accordance for example with the approach of FIGS. 3 to 6, or on the basis of additional data as discussed in the preceding paragraph, whether a detected device is authorised for coupling via the conductive regions, and only proceeding to couple the device to a power supply or data connection in a case where the device is determined to be authorise. This authorisation may be determined with reference to a stored data value for the device or classes of devices, or may be deemed to be authorised for all devices of a particular class.

Figure 9:
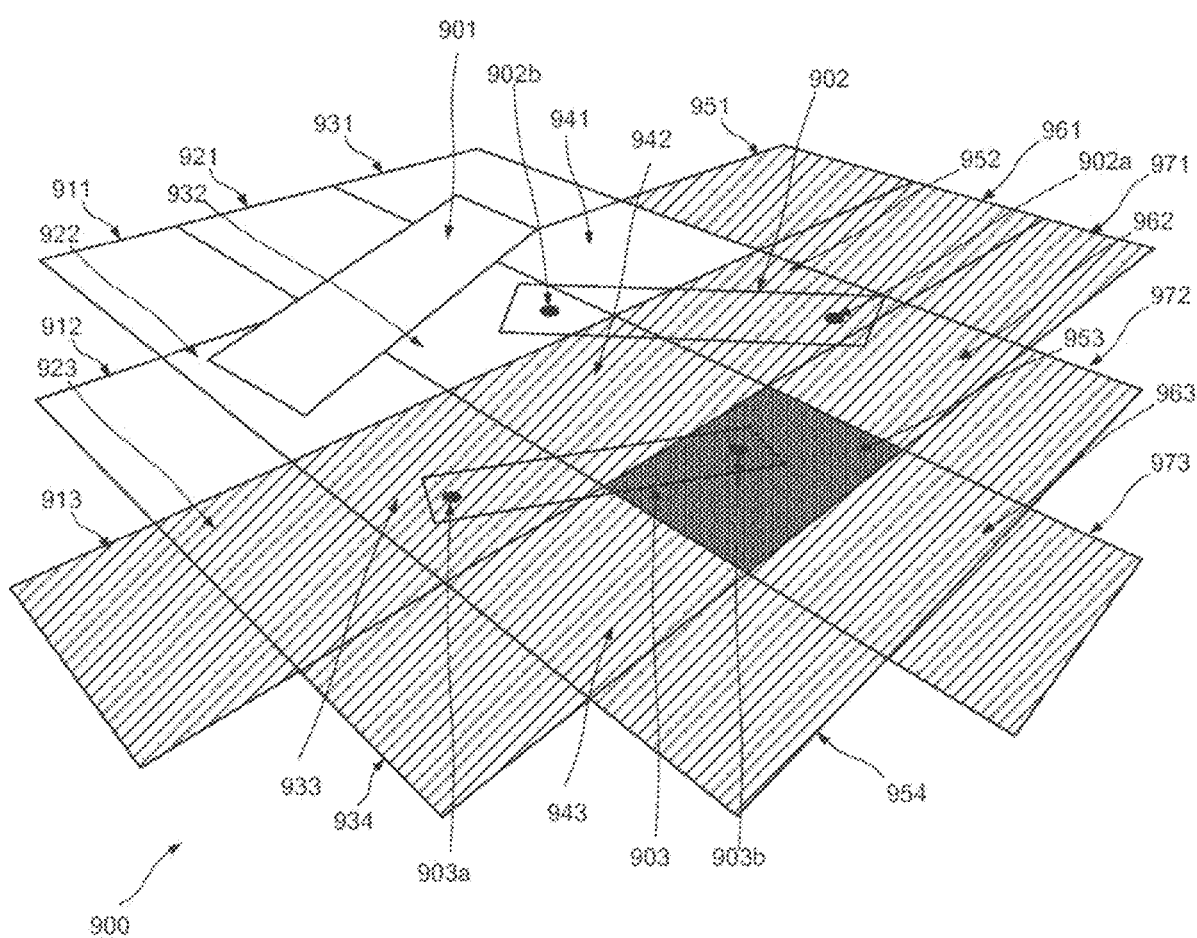
FIG. 9 shows an embodiment in which multiple articles are present on the conductive regions.

FIG. 9 shows an embodiment in which multiple articles are present on the conductive regions.

As described above, the conductive regions may be used to detect and couple devices. By way of example, such devices may include e-cigarettes, smart phones, smart watches or any IoT device, portable backup batteries, tablet computers, laptop computers, etc. It will be appreciated that the present invention may be applied equally to any device able to benefit from a physical data or power connection. In particular, it is not limited in scale to small devices such as those shown, but may be extended to vehicles, rack mounted computer or communications equipment, medical devices, etc.

As shown, three articles 901, 902 and 903 are disposed on the surface 900. The surface 900 comprises a matrix of conductive regions 911, 912, 913, 921, 922, 923, 931, 932, 933, 934, 941, 942, 943, 951, 952, 953, 954, 961, 962, 963, 971, 972 and 973. As shown, articles 902 and 903 are devices susceptible to electrical connection. Device 902 has a negative power terminal 902a and a positive power terminal 902b. Device 903 has a negative power terminal 903a and a positive power terminal 903b. Whilst article 901 is an article causing a short condition. As discussed above, power requirements may vary from one device to the next. For example, device 902 may require a 3.3V supply, whilst device 903 requires a 5V supply. On the basis of the approach described above with reference for example to FIG. 6, and as shown, conductive region 953 has been set to 5V, regions 913, 923, 933, 934, 942, 943, 951, 952, 954, 961, 962, 963, 971, 972 and 973 are set by the operation of the interface controller to 0V and conductive regions 911, 912, 921, 922, 931, 932 and 941 are set to 3.3V. It will be noted that while the electrode 902b of device 902 is only in contact with conductive region 932, region 932 is also in contact with the conductive article 901, which is also in contact with conductive regions 911, 912, 921, 922, 931 and 941, so that in accordance with the principles discussed with reference to FIG. 6, these conductive regions are all set to the same voltage.

In certain embodiments, a class of devices susceptible to electrical connection by means of the conductive regions may comprise a source of electrical power, such as a battery or other storage device. Where such a device is coupled by means of the conductive regions, the coupling interface may establish connections with other devices coupled via the conductive regions such that these other devices receive some or all of their power requirements from the device providing electrical power, as well as or instead of the internal connection by the coupling interface to a primary power source as discussed with reference to FIG. 3.

It will be appreciated that many of the procedures implemented by the coupling interface as discussed above may be seen in terms of a series of method steps.

Figure 10:
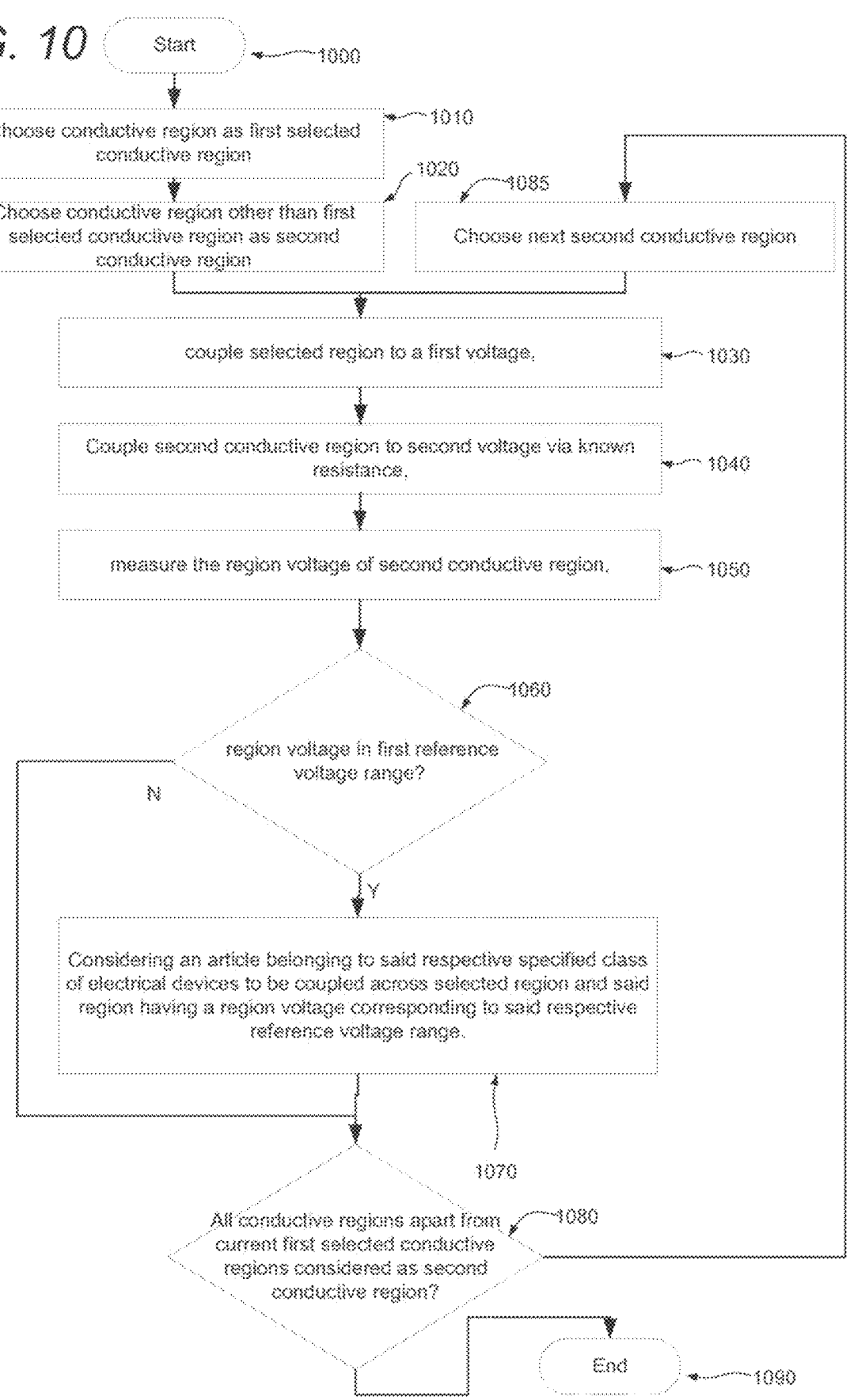
FIG. 10 presents steps of a method in accordance with an embodiment.

FIG. 10 presents steps of a method in accordance with an embodiment. Specifically, FIG. 10 presents a method of establishing an electrical connection with an electrically conductive article coupled across an arbitrary pair of conductive regions.

As show, the method starts at step 1000 before proceeding to step 1010 at which a first conductive region is chosen as first selected conductive region. The method then proceeds to step 1020 at which a conductive region other than that selected as first selected conductive regions is selected as second conductive region. The method next proceeds to step 1030 at which the first selected conductive region is coupled to a first voltage. The method next proceeds to step 1040 at which the second conductive region is coupled to a second voltage in a measurement condition, where the second voltage defines a first potential difference with respect to the first voltage, via a respective known resistance.

The method next proceeds to step 1050 at which the voltage of the second conductive region is measured. At step 1060 the voltage of the second conductive region is compared to one or more first reference voltage ranges, each reference voltage range corresponding to a specified class of electrical device, and in a case where the region voltage corresponds to a respective first reference voltage range the method proceeds to step 1070 at which an article belonging to the respective specified class of electrical devices is considered to be coupled across the first selected region and the second region before proceeding to step 1080. In a case where the region voltage does not correspond to a respective first reference voltage range the method proceeds directly to step 1080 at which it is determined whether all conductive regions apart from the current first selected conductive region have considered as the second conductive region, and in a case where it is determined that whether all conductive regions apart from the current first selected conductive region have considered as the second conductive region the method terminates at step 1090. Otherwise the method proceeds to step 1085 at which the next second conductive region is selected before looping back to step 1030. On this basis, each of the plurality of regions other than the selected region is coupled in a measurement condition to a second voltage, the second voltage defining a first potential difference with respect to the first voltage, via a respective known resistance.

It will be appreciated that this method may be extended to include any or all of the various additional processes presented with respect to the coupling interface above, in particular with respect to the exclusion of false positives due to oscillation conditions, the coupling of devices to power in response to the determination that an article is present and constitutes an electrical device susceptible to electrical connection via the coupling device, the determination of devices or classes of device, the differentiation of short circuits, open circuits and devices, the storage and/or retrieval of device or device class data, the detection and/or management of multiple devices, the detection and/or management of device with more than two electrodes, location determination and so on.

It will furthermore be appreciated that features of the various embodiments of the invention as presented above may be combined in any combination. For example, any two or more of the various additional processes presented with respect to the coupling interface above, in particular with respect to the exclusion of false positives due to oscillation conditions, the coupling of devices to power in response to the determination that an article is present and constitutes an electrical device susceptible to electrical connection via the coupling device, the determination of devices or classes of device, the differentiation of short circuits, open circuits and devices, the storage and/or retrieval of device or device class data, the detection and/or management of multiple devices, the detection and/or management of device with more than two electrodes, location determination may be combined in alternative embodiments.

The method of FIG. 10 may further comprise an initial sequence of steps prior to step 1010 whereby voltage of each conductive region is checked to ensure it is not at 5V or 0V, which would mean that a short circuit exists between the first conductive region and others that are already supplying or receiving current.

Figure 11:
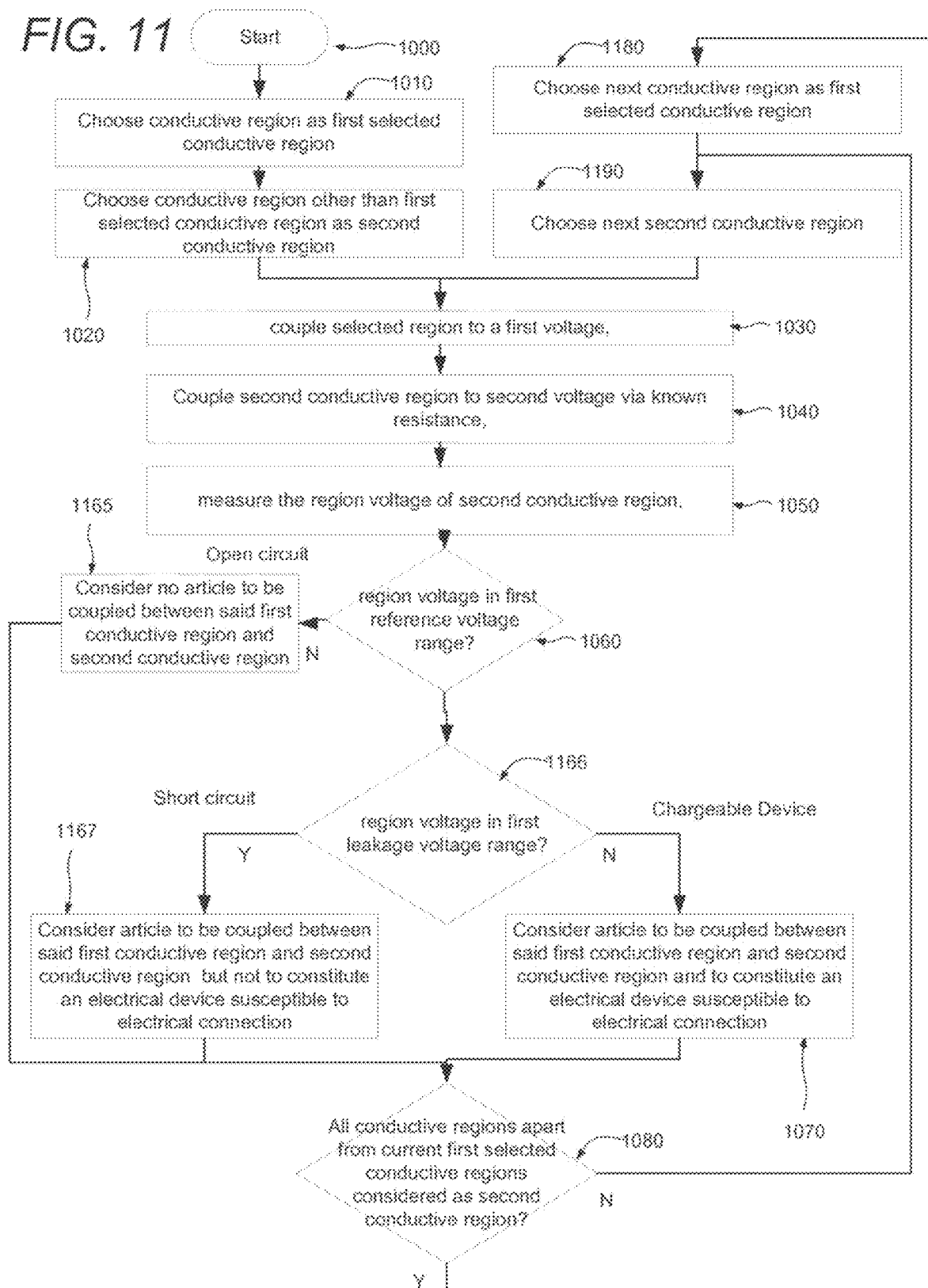
FIG. 11 shows a variant of the method of FIG. 9.

FIG. 11 shows a variant of the method of FIG. 10. As shown, FIG. 11 integrates the steps of FIG. 10 in a loop permitting the application of the method to an arbitrary number of conductive regions, and demonstrates additional logic for distinguishing open and short circuit conditions. Specifically, as shown the method integrates steps 1000, 1010, 1020, 1030, 1040, 1050, 1060, 1070 as presented above. In accordance with the method of FIG. 11, if it is determined at step 1060 that he region voltage is in a first reference voltage range (corresponding to a flow of current through the known voltage, which might be through an interface adapter as described with respect to FIG. 4 or 5 for example, or alternatively through a short circuit). If it is determined at step 1060 that the voltage is not within the predetermined set of values, the method proceeds to step 1165 at which it is considered that no article is coupled between the first conductive region and the second conductive region before proceeding to step 1166 as discussed below. It will be appreciated that another explanation for the lack of current flow may be that a coupling adapter as described for example with reference to FIG. 4 or 5 is present, but coupled across the conductive regions in a reverse biased manner. Where this is the case, while according to the logic of FIG. 11 the two conductive regions will temporarily be considered erroneously not to be connected in any way, this situation will be resolved when the method iterates to the point where the second conductive region is selected at step 1180 as discussed below as the first conductive region. In view of this scenario, the method may additionally integrate a presumption that in a given cycle the relationship between two conductive regions may be updated from "no article present" to "coupling device present", but not the converse.

If at step 1060 it is determined that the region voltage does fall within the predetermined set of values, the method proceeds to step 1166 at which it is determined whether the region voltage falls within a first short circuit voltage range, corresponding to a subset of the predetermined first reference voltage ranges relating to high currents/voltage drops caused by a low resistance connection between conductive regions. If at step 1166 it is determined that the region voltage falls within a first short circuit voltage range, the method proceeds to step 1167 at which it is considered that an article is coupled between the first conductive region and the second conductive region, but that this article does not constitute an electrical device susceptible to electrical connection, that is to say, a conductive article causing a short circuit or low resistance connection between two regions.

Otherwise, the method proceeds to step 1070 at which it is considered that an article is coupled between the first conductive regions and the second conductive region and furthermore that this article constitutes an electrical device susceptible to electrical connection. From steps 1165, 1167 or 1070 the method proceeds to step 1080 at which it is considered whether all conductive regions apart from the current first selected conductive regions have been considered as the second conductive region. If it is determined that all conductive regions apart from the current first selected conductive regions have been considered as the second conductive region, the method loops back to step 1190 at which the next second conductive region is selected before repeating steps 1030, 1040, 1050, 1060 as discussed above with the new pair of conductive regions. If at step 1080 it is determined that all conductive regions apart from the current first selected conductive region have been considered as the second conductive region, the method proceeds to step 1180 at which a next conductive region is selected as the first conductive region, and an new cycle begins. Thus, as described, the method of FIG. 11 will loop iteratively through every combination of conductive regions, before starting again from the beginning. It will be appreciated that additional steps of storing the results of determinations, managing voltages of respective conductive regions between measurement cycles and so on may easily be added to the sequence.

It will be appreciated that a pause may be implemented after each cycle during which the voltages of respective conductive regions may be maintained in a steady state on the basis of the determinations made during the preceding measurement cycle. Alternatively or additionally, voltages for conductive regions not currently under measurement may be maintained at the levels determined at their last available determination during the measurement cycle.

As such certain embodiments provide a charging surface comprising multiple conductive regions can be used to charge an electronic device placed on it the surface so that electrodes on the device engage respective conductive regions of the surface. In order to distinguish such chargeable devices from short circuits and other spurious connections, the coupling interface associated with the charging surface is controlled so as to establish a text voltage across each pair of conductive regions in sequence, and look for pairs of conductive region demonstrating a voltage drop characteristic of a particular class of device. Relationships between every pair of conductive regions can be determined and recording, and the voltage level supplied to each conductive region set accordingly. The coupling interface may furthermore operate to identify device classes, and to set supply voltages or establish additional connections on the basis of stored device class information. Discrimination on the basis of voltage drop can be enhanced by the provision of a coupling adapted associated with a device to be detected, where the coupling adapter demonstrates an anti-inversion characteristic, for example implemented with a MOSFET, across at least a pair of these electrodes.

Many of the preceding embodiments, including in particular those described with reference to FIGS. 10 and 11 may be implemented by hardware and/or by software.

Software embodiments include but are not limited to applications, firmware, resident software, microcode, etc. The invention can take the form of a computer program product accessible from a computer-usable or computer-readable medium providing program code for use by or in connection with a computer or an instruction execution system. Software embodiments include software adapted to implement the steps discussed above with reference to FIG. 10 or 11.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, a application-programming interface (API), one or more libraries, and/or other computer-program product, or any combination of such entities.

The user device may be a mobile device such as a smart phone or tablet, a drone, a computer or any other device with processing capability, such as a robot or other connected device, including IoT (Internet Of Things) devices.

Figure 12:
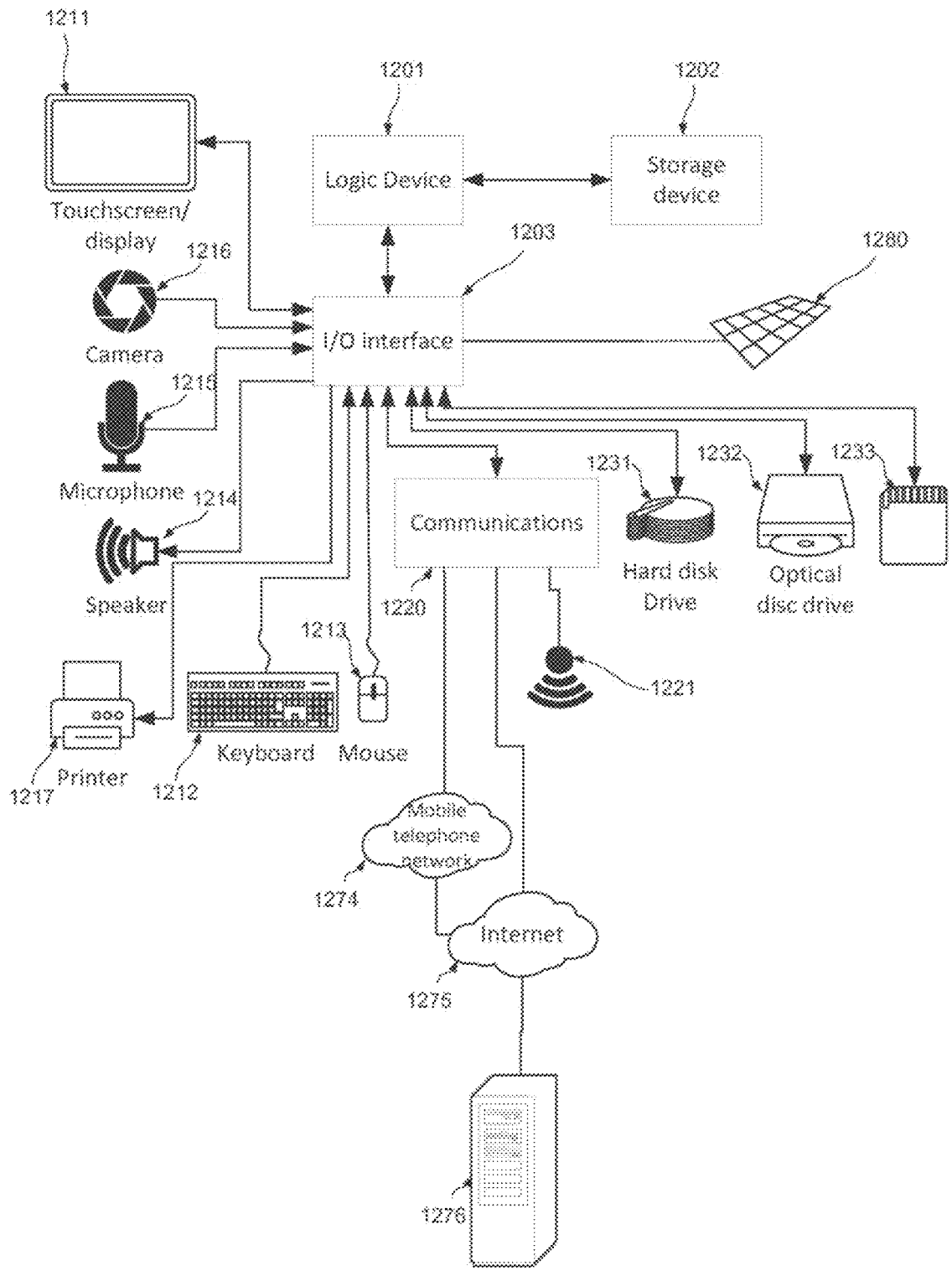
FIG. 12 shows a generic computing system suitable for implementation of embodiments of the invention.

FIG. 12 shows a generic computing system suitable for implementation of embodiments of the invention.

A shown in FIG. 12, a system includes a logic device 1201 and a storage device 1202. The system may optionally include a display subsystem 1202, input/output subsystem 1203, communication subsystem 1220, and/or other components not shown.

Logic device 1201 includes one or more physical devices configured to execute instructions. For example, the logic device 1201 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 1201 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 1201 optionally may be distributed among two or more separate devices, which may be remotely located and/or configured for coordinated processing. Aspects of the logic device 1201 may be virtualized and executed by remotely accessible, networked computing devices configured in a cloud-computing configuration.

Storage device 1202 includes one or more physical devices configured to hold instructions executable by the logic device to implement the methods and processes described herein. When such methods and processes are implemented, the state of storage 1202 device may be transformed—e.g., to hold different data.

Storage device 1202 may include removable and/or built-in devices. Storage device may be locally or remotely stored (in a cloud for instance). Storage device 1202 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 1203 adapted to support communications between the Logic device 1201 and further system components. For example, additional system components may comprise removable and/or built-in extended storage devices. Extended storage devices may comprise one or more types of storage device including optical memory 1232 (e.g., CD, DVD, HD-DVD, Blu-Ray Disc, etc.), semiconductor memory 1233 (e.g., RAM, EPROM, EEPROM, FLASH etc.), and/or magnetic memory 1231 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 1201 and storage device 1202 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device 1202. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 12 may be used to implement embodiments of the invention.

For example a program implementing the steps described with respect to FIG. 10 or 10, or the algorithms presented above may be stored in storage device 1202 and executed by logic device 1201. The functions of the unit 303 may similarly be implemented by a program performing the required functions, in communication with additional dedicated hardware units as necessary.

While shown as a peripheral device, the coupling interface may also be physically integrated with the surface comprising the plurality of conductive regions.

As shown, the conductive regions are provided as a peripheral device 1280. This device may comprise simply the conductive regions themselves, with switching, power supply and as necessary data interfacing provided by the I/O interface, or the switching and or other functions may be implemented in the conductive region device under control of the computing device.

It will be appreciated that a "service", as used herein, is an application program executable across multiple user sessions. A service may be available to one or more system components, programs, and/or other services. In some implementations, a service may run on one or more server-computing devices.

When included, display subsystem 1211 may be used to present a visual representation of data held by a storage device. This visual representation may take the form of a graphical user interface (GUI). As the herein described methods and processes change the data held by the storage device 1202, and thus transform the state of the storage device 1202, the state of display subsystem 1211 may likewise be transformed to visually represent changes in the underlying data. Display subsystem 1211 may include one or more display devices utilizing virtually any type of technology for example as discussed above. Such display devices may be combined with logic device and/or storage device in a shared enclosure, or such display devices may be peripheral display devices. An audio output such as speaker 1214 may also be provided.

When included, input subsystem may comprise or interface with one or more user-input devices such as a keyboard 1212, mouse 1213, touch screen 1211, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone 1215 for speech and/or voice recognition; an infrared, colour, stereoscopic, and/or depth camera 1216 for machine vision and/or gesture recognition; a head tracker, eye tracker, accelerometer, and/or gyroscope for motion detection and/or intent recognition; as well as electric-field sensing componentry for assessing brain activity. The Input/output interface 1203 may similarly interface with a loudspeaker 1214, vibromotor 1240 or any other transducer device as may occur to the skilled person. For example, the system may interface with a printer 1217.

When included, communication subsystem 1220 may be configured to communicatively couple computing system with one or more other computing devices. For example, communication module of communicatively couple computing device to remote service hosted for example on a remote server 1276 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 1274, or a wired or wireless local- or wide-area network. In some embodiments, the communication subsystem may allow computing system to send and/or receive messages to and/or from other devices via a network such as Internet 1275. The communications subsystem may additionally support short range inductive communications with passive or active devices (NFC, RFID, UHF, etc). In certain variants of the embodiments described above, the traffic data may be received via the telephone network 1274 or internet 1275.

The system of FIG. 12 is intended to reflect a broad range of different types of information handling system. It will be appreciated that many of the subsystems and features described with respect to FIG. 8 are not required for implementation of the invention, but are included to reflect possible systems in accordance with the present invention. It will be appreciated that system architectures vary widely, and the relationship between the different sub-systems of FIG. 8 is merely schematic, and is likely to vary in terms of layout and the distribution of roles in systems. It will be appreciated that, in practice, systems are likely to incorporate different subsets of the various features and subsystems described with respect to FIG. 8.

Figure 13:
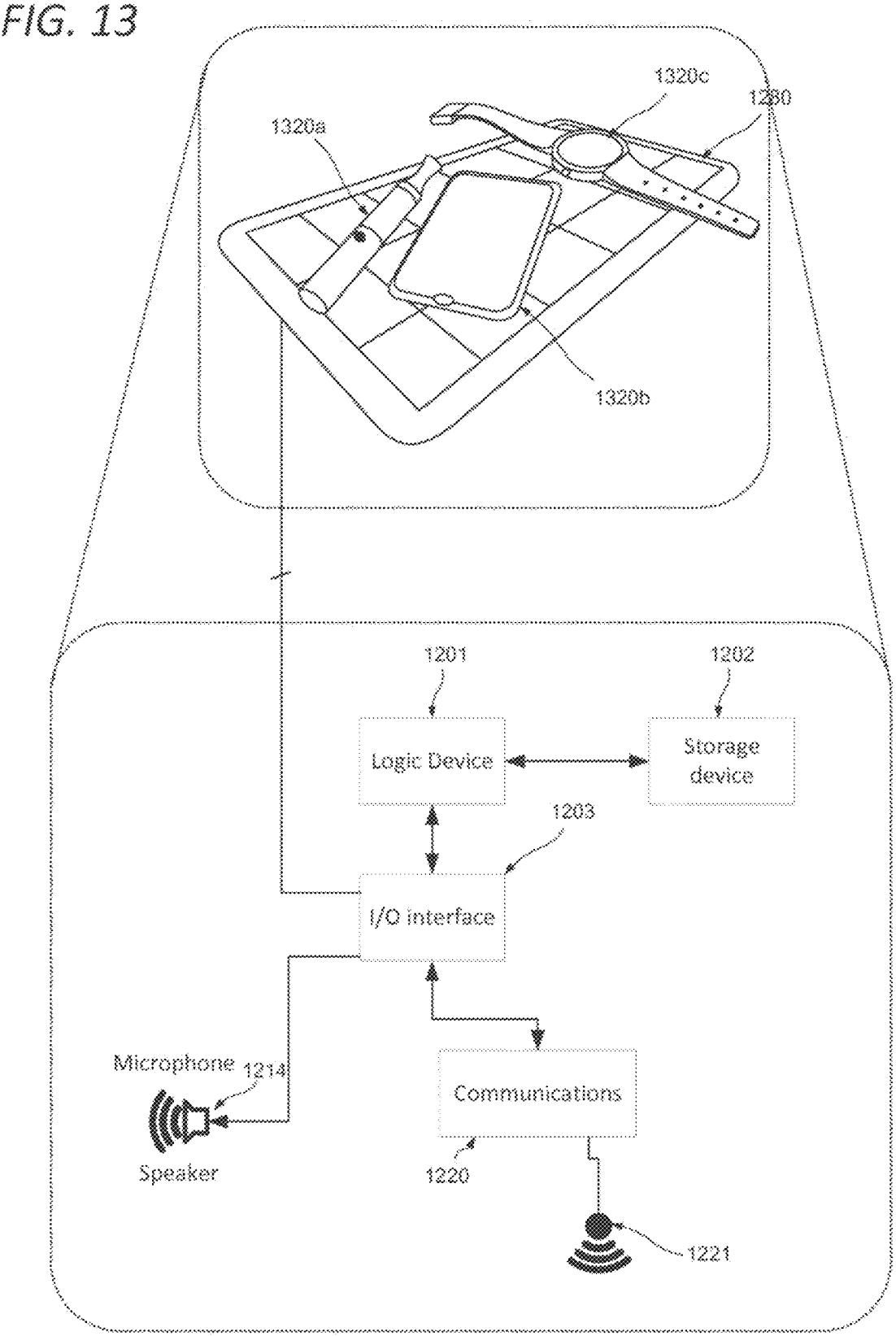
FIG. 13 shows a surface device adaptable to constitute an embodiment.

FIG. 13 shows a surface device adaptable to constitute an embodiment. As shown in FIG. 13, the device incorporates elements 1201, 1202, 1203, 1220, optional near field communications interface 1221, speaker 1214, and conductive regions 1280 as described above.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A coupling interface for establishing an electrical coupling with an electrically conductive article, comprising:
   a controller;
   a plurality of switches;
   wherein said coupling interface controls a plurality of conductive regions, each of said plurality of conductive regions being switchably selected and coupled to a first voltage via said controller and said plurality of switches;
   wherein at least one of said plurality of conductive regions other than said selected region is coupled as a measurement region in a measurement condition to a second voltage, said second voltage defining a first potential difference with respect to said first voltage;
   wherein said coupling interface is further adapted to measure a voltage of said measurement region, and to compare said measured voltage of said measurement region to one or more reference voltage ranges, said respective reference voltage range corresponding to a respective class of electrical device, and in a case where said measured voltage of said measurement region corresponds to said respective reference voltage range, to establish a respective persistent electrical connection to said selected region and said measurement region having said measured voltage corresponding to said respective first reference voltage range via said controller and said plurality of switches.

2. The coupling interface of claim 1 wherein the coupling interface is further adapted to couple the voltage of the selected region to a third voltage and to couple said measurement region having said measured voltage corresponding to said respective reference voltage range, to a fourth voltage, where a difference between said third voltage and said fourth voltage corresponds to a defined supply voltage associated with said respective class of electrical device.

3. The coupling interface of claim 1 wherein in a case where any said measurement region has a voltage corresponding to a first short circuit voltage range, considering an article to be coupled across said selected region and said measurement region having a voltage corresponding to said first short circuit voltage range to constitute a short circuit.

4. The coupling interface of claim 3 wherein said coupling interface is adapted in a case where an article to be coupled across said selected region and said measurement region is considered to constitute a short circuit, to couple said selected region and said measurement region having a voltage corresponding to said first short circuit voltage range to a common voltage.

5. The coupling interface of claim 1, wherein said coupling interface is adapted to further couple said selected region to a fifth voltage via a respective known resistance, and to switch said measurement region to a sixth voltage, said sixth voltage defining a potential difference with respect to said fifth voltage of opposite polarity to the potential difference defined by said first potential difference with respect to said second voltage, and to measure said voltage of said selected region, and in a case where the voltage of said selected region lies in a second short circuit voltage range, considering said article to be a conductive article creating a short circuit between said selected region and said measurement region in a measurement condition.

6. The coupling interface of claim 1, wherein said coupling interface is adapted in a case where said region voltage for any said reference voltage falls in said reference voltage range to switch said selected region to a fifth voltage via a respective known resistance, and to switch said measurement region to a sixth voltage, said sixth voltage defining a potential difference with respect to said fifth voltage of opposite polarity to the potential difference defined by said first potential difference with respect to said second voltage, and to measure said voltage of said of said selected region, and in a case where the voltage of said selected region lies in a second reference voltage range, considering said article to be a power consuming electrical device coupled across said selected region and said measurement region.

7. The coupling interface of claim 5 wherein:
coupling said selected region to said first voltage, and a said measurement region to said second voltage constitutes a first state and coupling said selected region to said fifth voltage, and a said measurement region in to said sixth voltage constitutes a second state, and
wherein said coupling interface is adapted oscillate between said first state and said second state a plurality of times with a predetermined timing, and to measure a voltage of one or more said measurement regions at a plurality of said oscillations, and in a case where the voltage for any said measurement region exhibits a first predetermined characteristic consistently over said plurality of oscillations, considering said article to be coupled across said selected region and said measurement region.

8. The coupling interface of claim 7 wherein said predetermined timing is defined so as to distinguish mechanical or electrical oscillations of said article across said regions.

9. The coupling interface of claim 1 wherein said coupling interface is further adapted to establish one or more data connections between an information handling system and one or more respective said conductive regions, wherein said respective conductive regions with respect to which data connections are established are selected as having a predetermined spatial relationship to said selected region and said region having a voltage falling within a said reference voltage range.

10. The coupling interface of claim 9 wherein said predetermined spatial relationship is retrieved as a function of said respective specified class of electrical device.

11. The coupling interface of claim 1 further comprising said plurality of conductive regions.

12. The coupling interface of claim 1 comprising a memory, said coupling interface being adapted to store values in said memory defining for each said conductive region a relationship with each other said conductive region, each said relationship being one of:
in low resistance connection to,
providing current to, or
receiving current from,
wherein said coupling interface is adapted to determine and store each said relation in said memory with reference to the voltage between every pair of said conductive regions as determined in accordance with claim 1, and wherein said coupling interface is further adapted to couple the voltage of each said conductive region as a function of said relationships.

13. A method of establishing an electrical connection with an electrically conductive article coupled across an arbitrary pair of conductive regions, said method comprising:
coupling a first region as a selected region to a first voltage,
coupling a second region other than said selected region to a second voltage as a measurement region in a measurement condition, said second voltage defining a first potential difference with respect to said first voltage, via a respective known resistance,
measuring said voltage of said measurement region,
comparing said measured voltage of said measurement region to one or more reference voltage ranges, said respective reference voltage range corresponding to a respective class of electrical device, and in a case where any said measured voltage of said measurement region corresponds to said respective reference voltage range,
establishing a respective persistent electrical connection to said selected region and said measurement region having said measured voltage corresponding to said respective reference voltage range.

14. A computer program product comprising computing instructions stored on a non-transitory computer storage medium for establishing an electrical connection with an electrically conductive article coupled across an arbitrary pair of conductive regions, said computing instructions when executed by one or more processors, configure said one or more processors for:
coupling a first region as a selected region to a first voltage,
coupling a second region other than said selected region to a second voltage as a measurement region in a measurement condition, said second voltage defining a first potential difference with respect to said first voltage, via a respective known resistance,
measuring said voltage of said measurement region,
comparing said measured voltage of said measurement region to one or more reference voltage ranges, said respective reference voltage range corresponding to a respective class of electrical device, and in a case where said measured voltage of said measurement region corresponds to said respective reference voltage range,
establishing a respective persistent electrical connection to said selected region and said measurement region having said measured voltage corresponding to said respective reference voltage range.

* * * * *